United States Patent
Gelov et al.

(10) Patent No.: US 11,317,638 B2
(45) Date of Patent: May 3, 2022

(54) COLD BREW COFFEE BEVERAGE AND METHOD OF MAKING THE SAME

(71) Applicants: HEARTLAND CONSUMER PRODUCTS, LLC, Carmel, IN (US); Teodor H. Gelov, Carmel, IN (US); Ricardo Reyes Trevino, Carmel, IN (US); Megan Leigh Sawyer, Indianapolis, IN (US); Peter Deyun Kim, Indianapolis, IN (US); Kent Crosby, Greenwood, IN (US)

(72) Inventors: Teodor H. Gelov, Carmel, IN (US); Ricardo Reyes Trevino, Carmel, IN (US); Megan Leigh Sawyer, Indianapolis, IN (US); Peter Deyun Kim, Indianapolis, IN (US); Kent Crosby, Greenwood, IN (US)

(73) Assignee: Heartland Consumer Products LLC, Carmel, IN (US)

( * ) Notice: Subject to any disclaimer, the term of this patent is extended or adjusted under 35 U.S.C. 154(b) by 229 days.

(21) Appl. No.: 16/080,165

(22) PCT Filed: Nov. 3, 2017

(86) PCT No.: PCT/US2017/060042
§ 371 (c)(1),
(2) Date: Aug. 27, 2018

(87) PCT Pub. No.: WO2018/128696
PCT Pub. Date: Jul. 12, 2018

(65) Prior Publication Data
US 2019/0053511 A1   Feb. 21, 2019

Related U.S. Application Data

(60) Provisional application No. 62/416,999, filed on Nov. 3, 2016.

(51) Int. Cl.
A23F 5/26        (2006.01)
A23F 5/24        (2006.01)
(Continued)

(52) U.S. Cl.
CPC .............. *A23F 5/262* (2013.01); *A23F 5/00* (2013.01); *A23F 5/246* (2013.01); *A47J 31/002* (2013.01);
(Continued)

(58) Field of Classification Search
CPC ..................................................... A23F 5/262
See application file for complete search history.

(56) References Cited

U.S. PATENT DOCUMENTS 3,554,761 A * 1/1971 Carbonell ............... A23F 5/486
                                                    426/385
4,983,408 A   1/1991 Colton
(Continued)

FOREIGN PATENT DOCUMENTS

AU   2011355934 A1   9/2013
CN   103781712 B     5/2016
(Continued)

OTHER PUBLICATIONS

"It's Cheap and easy to make double-strength cold brew coffee at home" Jun. 7, 2016 https://www.businessinsider.com/how-to-make-cold-brew-coffee-recipe-2016-6 (Year: 2016).*
(Continued)

*Primary Examiner* — Katherine D Leblanc
(74) *Attorney, Agent, or Firm* — Taft Stettinius & Hollister LLP; Joseph M. Bennett-Paris

(57) ABSTRACT

Disclosed are processes for making cold brew beverage compositions including concentrates and apparatus for preparing cold brew beverage compositions. The disclosed processes and apparatus allow for efficient, rapid, industrial (Continued)

scale production of cold brew beverage compositions having improved total solid content, improved flavor stability, longer shelf-life, and adaptability to use in small volume containers.

24 Claims, 15 Drawing Sheets

(51) Int. Cl.
*A47J 31/06* (2006.01)
*A47J 31/00* (2006.01)
*A47J 31/44* (2006.01)
*A23F 5/00* (2006.01)

(52) U.S. Cl.
CPC .......... *A47J 31/0615* (2013.01); *A47J 31/44* (2013.01); *A47J 31/4403* (2013.01); *A47J 31/0636* (2013.01)

(56) References Cited

U.S. PATENT DOCUMENTS

| | | | |
|---|---|---|---|
| 5,820,914 A | 10/1998 | Noble et al. | |
| 5,827,560 A | 10/1998 | Fu et al. | |
| 5,925,389 A | 7/1999 | Lehmberg et al. | |
| 5,952,023 A | 9/1999 | Lehmberg et al. | |
| 6,042,861 A | 3/2000 | Anslow et al. | |
| 6,054,162 A | 4/2000 | Bradbury et al. | |
| 6,235,323 B1 | 5/2001 | Carns et al. | |
| 6,274,187 B1 | 8/2001 | Lehmberg et al. | |
| 6,296,887 B1 | 10/2001 | Mehta et al. | |
| 6,399,136 B1 | 6/2002 | Watkins, Jr. et al. | |
| 6,426,106 B1 | 7/2002 | Barrett et al. | |
| 6,491,961 B1 | 12/2002 | Balentine et al. | |
| 6,589,575 B2 | 7/2003 | Ganesan et al. | |
| 6,602,538 B1 | 8/2003 | Watkins, Jr. et al. | |
| 6,761,918 B2 | 7/2004 | Pulikkottil et al. | |
| 6,780,454 B2 | 8/2004 | Balentine et al. | |
| 6,833,144 B2 | 12/2004 | Goodsall et al. | |
| 7,234,389 B1 | 6/2007 | Lassota | |
| 7,815,960 B2 | 10/2010 | Quan et al. | |
| 8,277,864 B2 | 10/2012 | Tonyes et al. | |
| 8,459,178 B2 | 6/2013 | Miller | |
| 8,529,978 B2 | 9/2013 | Sasame et al. | |
| 8,771,774 B2 | 7/2014 | Miller | |
| 9,113,643 B2 | 8/2015 | Heijman et al. | |
| 2002/0164410 A1 | 11/2002 | Ogden et al. | |
| 2002/0197379 A1 | 12/2002 | George et al. | |
| 2005/0193892 A1* | 9/2005 | Rahn | A47J 31/0668 99/279 |
| 2008/0057172 A1 | 3/2008 | Jones et al. | |
| 2008/0095913 A1 | 4/2008 | Jones et al. | |
| 2008/0124442 A1 | 5/2008 | Pierre | |
| 2008/0160135 A1 | 7/2008 | Zhang | |
| 2008/0254189 A1 | 10/2008 | Mavroudis | |
| 2008/0292772 A1 | 11/2008 | Iwasaki et al. | |
| 2009/0004331 A1 | 1/2009 | Bloom et al. | |
| 2010/0266740 A1 | 10/2010 | Van Den Aker et al. | |
| 2012/0258204 A1 | 10/2012 | Tsuji et al. | |
| 2012/0308688 A1 | 12/2012 | Peterson et al. | |
| 2013/0136833 A1 | 5/2013 | Vastardis et al. | |
| 2014/0106055 A1 | 4/2014 | Gamay | |
| 2014/0178559 A1 | 6/2014 | Neace, Jr. | |
| 2015/0327567 A1 | 11/2015 | Heijman et al. | |
| 2016/0029655 A1 | 2/2016 | Heijman et al. | |
| 2016/0174591 A1 | 6/2016 | Lampron | |
| 2016/0183713 A1 | 6/2016 | Simpson | |
| 2016/0270587 A1 | 9/2016 | Yu et al. | |
| 2016/0287002 A1 | 10/2016 | Van Bruegel et al. | |
| 2016/0316957 A1 | 11/2016 | Tran | |
| 2016/0338522 A1 | 11/2016 | van Schyndel et al. | |
| 2016/0353761 A1 | 12/2016 | Paul | |
| 2017/0119006 A1 | 5/2017 | Ragnarsson | |
| 2017/0231245 A1 | 8/2017 | Mangigian | |

FOREIGN PATENT DOCUMENTS

| | | | |
|---|---|---|---|
| EP | 0267660 B1 | 3/1991 | |
| JP | S58149643 A | 9/1983 | |
| JP | H07313366 A | 12/1995 | |
| JP | H0956597 A | 3/1997 | |
| JP | H09192022 A | 7/1997 | |
| JP | H11244148 A | 9/1999 | |
| JP | 2002171989 A | 6/2002 | |
| JP | 3571307 B2 | 9/2004 | |
| JP | 2008259478 A | 10/2008 | |
| JP | 2010051254 A | 3/2010 | |
| JP | 5868786 B2 | 12/2013 | |
| JP | 2015133958 A * | 7/2015 | ............ A23F 5/243 |
| KR | 101611812 B1 | 4/2016 | |
| KR | 2015-016866-7 | 11/2016 | |
| KR | 20160133710 A | 11/2016 | |
| RU | 2527122 C2 | 8/2014 | |
| WO | 2007043873 A1 | 4/2007 | |
| WO | 2008082258 | 7/2008 | |
| WO | 2008082258 A1 | 7/2008 | |
| WO | 2011033523 | 3/2011 | |
| WO | 2011033523 A1 | 3/2011 | |
| WO | 2012012589 A1 | 1/2012 | |
| WO | 2014175610 | 10/2014 | |
| WO | 2014175610 A1 | 10/2014 | |
| WO | 2015093522 A1 | 6/2015 | |
| WO | 2016164796 | 10/2016 | |
| WO | 2016164796 A1 | 10/2016 | |
| WO | 2017032677 | 3/2017 | |
| WO | 2017032677 A1 | 3/2017 | |

OTHER PUBLICATIONS

"It's Time to stop wasting money iced coffee because this is a perfect DIY" Apr. 24, 2012 https://andthenwesaved.com/its-time-to-stop-wasting-money-on-iced-coffee-because-this-is-a-perfect-diy/ (Year: 2012).*

Kingston, L., "Section Two: Chemistry," in How to Make Coffee: The Science Behind the Bean; Ivy Press, 2015, pp. 32-53.

Kingston, L., "Section Four: Brewing," in How to Make Coffee: The Science Behind the Bean; Ivy Press, 2015, pp. 78-95.

Cipriani, T., The Science of Coffee: An analysis of total soluble extract resultant from various coffee brewing methods, https://tylercipriani.com/coffee-extract/, Aug. 15, 2014 (4 pages).

Fishel, H., "Morning Coffee Not Strong Enough? Do This Instead", https://food-hacks/Wonderhowto.com/how-to/morning-coffee-not-strong-enough-do-instead-0163739/, Nov. 19, 2015 (5 pages).

Gloess, et al. Comparison of nine common coffee extraction methods: instrumental and sensory analysis, 2013 Eur Food Res Technol 236:607-62, Jan. 30, 2013 (21 pages).

* cited by examiner

COLD BREW COFFEE BEVERAGE AND METHOD OF MAKING THE SAME

RELATED APPLICATIONS

This application claims priority to and takes the benefit of U.S. Provisional Patent Application No. 62/416,999 filed on Nov. 3, 2016, the contents of which are herein incorporated by reference.

FIELD OF INVENTION

The present disclosure relates generally to processes for making cold brew beverage compositions, apparatus for preparing cold brew beverage compositions, and improved cold brew beverage compositions including concentrates. In particular, the processes and apparatus disclosed herein allow for efficient, rapid, industrial scale production of cold brew beverage compositions having improved total solid content, improved flavor stability, longer shelf-life, and adaptability to use in small volume containers such as sealed coffee pods designed for use in single serve beverage maker such as Keurig®, Nespresso®, or similar home brewing machines.

BACKGROUND

Brewed beverages, such as coffee or tea, are very popular and common among many types of people in various cultures and in many countries around the world. Getting the best quality brew and achieving the best taste in the most efficient manner has been the goal of many coffee and tea brewers for many years. The cold brewing trend has become more mainstream over the past couple of years compared to the traditional hot brewing process.

In general, cold brew processes involve brewing ground coffee beans or tea leaves over a long period of time at close to ambient or colder water. Traditionally cold brew coffee processes take place in smaller vessels in a batch by batch process and result in a coffee concentrate of typically less than 6 Brix. The resulting cold brewed beverage has characteristics that may be considered more desirable when compared to the traditional hot brewing process. For example, a cold brewed coffee is generally found to be less acidic by consumers, higher in caffeine content, and has a smoother taste. Traditionally prepared hot brewed coffee, on the other hand, is generally found to have a more acidic taste and can cause unbalanced pH, heartburn symptoms, and associated discomfort for consumers. Although cold brew coffee is up to 60% less acidic than the traditional hot brewed coffee, the pH of the beverage during processing and after packaged has been found to drop over time, resulting in an acidic and bitter beverage. Consumers of such beverages are also interested in consuming a beverage brewed in an authentic cold-brew manner.

Prior art processes known to the applicants yield cold brew beverage compositions that have relatively low solid content levels and that lack qualities required for successful use in small volume containers or in unrefrigerated environments, such as in aseptic packaging commonly found in retail grocery stores or low volume coffee pods designed for home brewing machines. Prior art known to the applicants also fails to disclose any process or apparatus that is suited to industrial scale production of cold brew compositions that are suitable for use in aseptic packaging including small volume packaging in single serve beverage maker such as Keurig or Nespresso coffee pods. There is a long felt need for improved processes and apparatus for making cold brew beverage compositions, including cold brew coffee concentrates, which have improved total solid content, improved flavor stability, longer shelf life, and adaptability to use in small volume containers such as sealed coffee pods designed for use in single serve beverage maker such as Keurig, Nespresso, or similar home brewing machines.

SUMMARY OF THE INVENTION

In one embodiment, a cold brew process for preparing a beverage is provided. The process include the steps of (i) providing at least one filter bag; (ii) adding an infusion material to at least one filter bag; (iii) subjecting the at least one filter bag of infusion material to a first steeping step for a first duration of time to form a first beverage extract and pumping the first beverage extract out, and (iv) exposing the at least one filter bag of infusion material to fresh purified water in order to perform a second steeping step for a second duration of time to form a rinse beverage extract.

In another embodiment, a coffee concentrate product prepared by a cold brewing process is provided. The product is prepared by the process that include the steps of: (i) performing a first soak in a first vessel, and a second vessel to form a first beverage extract and a second beverage extract, wherein the first vessel and the second vessel each contain bags of coffee grounds, (ii) performing a second soak by combining the first beverage extract, and the second beverage extract in a third vessel containing bags of coffee grounds, to form a third beverage extract having a Brix level of about 10, and (iii) subjecting the third beverage extract to treatment with one or more buffers. The process may additionally include the step of aseptically packaging the third beverage extract in beverage cartridges or containers or pods and stored at 4° C.

In yet another embodiment, a coffee concentrate product prepared by a cold brewing process is provided. The process may include placing at least one filter bag filled with an infusion material into a first vessel, wherein the first vessel includes a tank body. The tank body may also include a bottom panel having an inner surface, and an outer surface, wherein the bottom panel comprises a first portion, a second portion that are configured to slope downward from the first elongated side, and the second elongated side toward a center portion of the bottom panel. The tank body is further configured to include a top opening, and a lid portion that is capable of covering the top opening of the tank body. The tank body additionally includes at least one perforated compartment disposed within the tank body and configured to hold at least one bag comprising an infusion material. The process in this embodiment may further include filling the first vessel with water, performing a first steeping process by soaking the at least one filter bag in the water to form a first beverage extract. The process additionally includes placing a second filter bag filled with an infusion material into a second vessel that is configured similarly to the first vessel, filling the second vessel with water, performing a second steeping process by soaking the second filter bag in the water of the second vessel to form a second beverage extract. The process further includes combining the first beverage extract and the second beverage extract in a third vessel to form a combined extract, wherein the third vessel is configured similarly to the first vessel; placing a third filter bag filled with an infusion material into the third vessel, and performing a third steeping process by soaking the third filter bag in the combined extract to form a third beverage extract, wherein the third beverage extract has Brix level of about 7 to about 13.

In another embodiment, a system for making a cold brew beverage is provided. The system may include a tank body comprising a first elongated side, a second elongated side, a first short side, and a second short side, wherein each side includes an inner surface and an outer surface. The tank body may also include a bottom panel having an inner surface, and an outer surface, wherein the bottom panel comprises a first portion, a second portion that are configured to slope downward from the first elongated side, and the second elongated side toward a center portion of the bottom panel. The first elongated side, the second elongated side, the first short side, the second short side, and the bottom panel define the tank body, and the tank body is further configured to include a top opening, and a first lid portion and a second lid portion that are capable of covering the top opening of the tank body. The tank body additionally includes at least one perforated compartment disposed within the tank body and configured to hold at least one bag comprising an infusion material.

BRIEF DESCRIPTION OF DRAWINGS

For the purpose of illustrating the invention certain embodiments of the invention are shown. It should be understood, however, that the invention is not limited to the precise arrangements and instrumentalities of the embodiments shown in the drawings.

FIG. 10A is a side view of one embodiment of a brewing tank illustrating the details of tank side-I with conduits.

FIG. 10 C is a side view of another embodiment of a nozzle that may be coupled to a brewing tank inlet.

FIG. 10 D is a cross section of nozzle opening that may be coupled to a brewing tank.

DETAILED DESCRIPTION

Disclosed and described herein is a novel brewing system or apparatus that is used to make a cold brew coffee product. The system includes one or more vessels or containers, such as but not limited to, large stainless steel tanks, to process a large number of bags of ground coffee submerged and segregated in the tank. The disclosed system and process allows for large scale manufacturing of cold brew concentrates using the benefits of small batch processing. The disclosed brewing process is semi-continuous, and can provide a coffee concentrate product that may vary in the Brix levels ("Brix" as used herein, is a measure in degrees of the amount of dissolved solids in a liquid), is less acidic, more shelf stable (i.e., a concentrate that retains a minimum pH from the time of packaging to the time of consumption, or a concentrate having a pH of 5.5 to 7.0) than the traditionally produced coffee.

A key achievement of the disclosed system and the process is the ability to follow traditional cold brewing methods to achieve a Brix level above 10. This level allows a regularly sized beverage cartridge, about 40 ml to about 100 ml, to be filled with the resulting cold brew concentrate and then when used with regularly available coffee systems such as a Keurig brewer, the resulting dilution results in a pleasant and palatable coffee beverage. Such cartridge can also be used by the consumer to pull off the lid and pour over ice and add water or other liquid such as milk, almond milk or the like to enjoy such product cold as opposed to hot.

The brewing system and the process are described in detail by way of examples and with reference to the figures. It will be appreciated that modifications to disclosed and described examples, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be and should not be construed as mandatory or limiting unless specifically designated as such. Selected examples of the brewing system and process for making a high quality cold brew coffee product are hereinafter disclosed and described in detail with reference made to FIGS. 1-14.

System for Making Cold Brew Coffee

Referring now to the FIGS. 1-14, FIG. 1 illustrates one embodiment of a brewing system 10 for making cold brew coffee.

Figure 11:
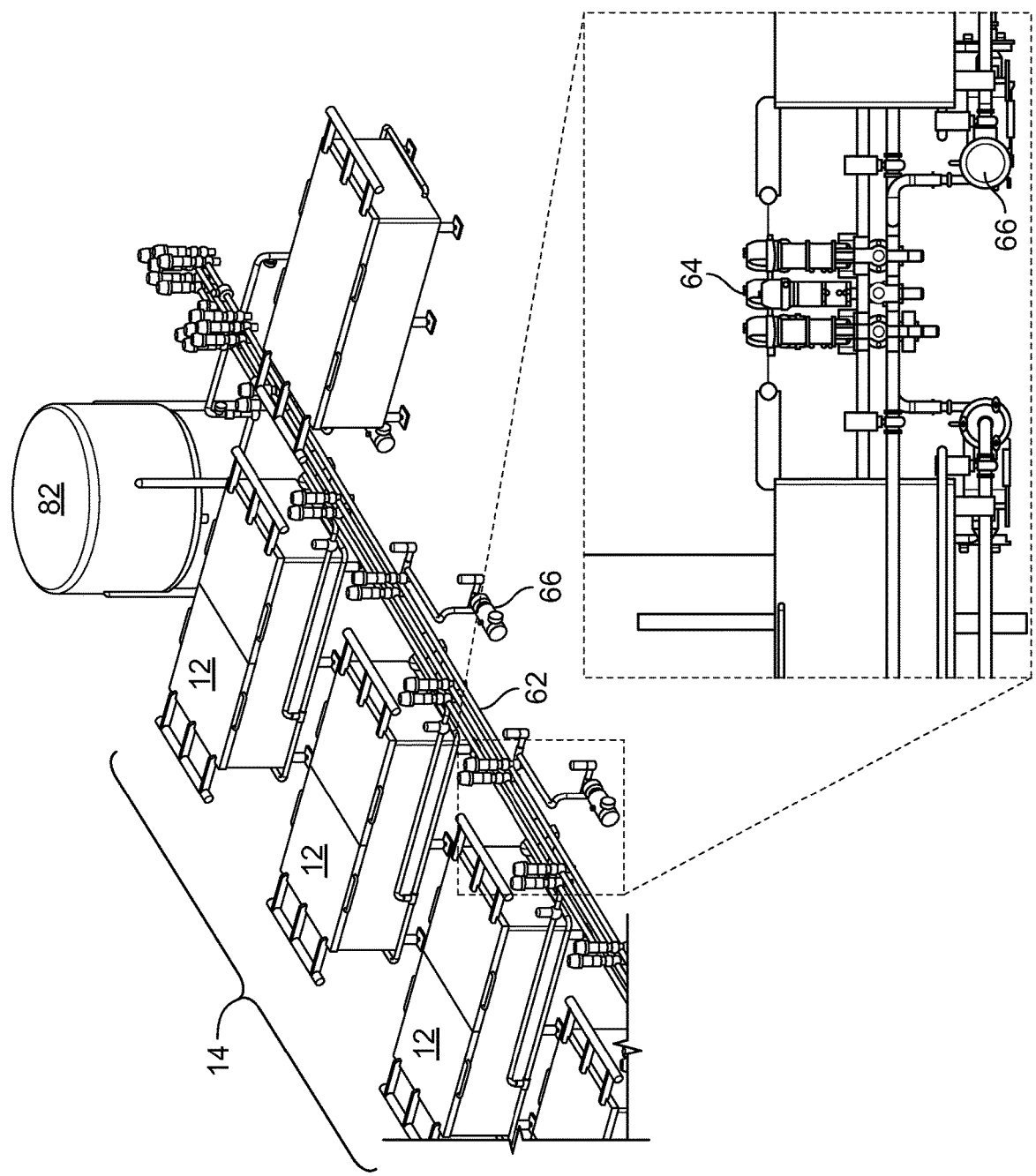
FIG. 11 illustrates a perspective view of tanks arranged in series during a large-scale cold brewing process.

The system may include a single vessel or brewing tank body 12 (shown in FIG. 1) or a series of tanks 14, as shown in FIG. 11, of any suitable shape and size to process a large scale batch of cold brew coffee detailed in this disclosure. The vessels or tanks may be interconnected by pipes, and a pumping system to power the liquid flow between the tanks (shown in FIG. 11).

In one embodiment, the tank body 12 may be single walled or a double walled steel. A tank may be at least 40 to about 48 inches tall from the ground, or about 22 inches from the bottom surface to the upper surface of the tank. The height of the tank body 12 may be such that it facilitates personnel to load or unload the coffee bags in the tank body 12 without an external platform. The tank body 12 may be about 110 inches long and about 65 inches wide. Each tank body 12 may hold at least about 500 to about 1500 gallons of liquid or greater. Although in one embodiment, the tank has a rectangular in shape it may be apparent to one skilled in the art that any vessel of suitable size and shape may be used for the disclosed cold brewing process.

Figure 1:
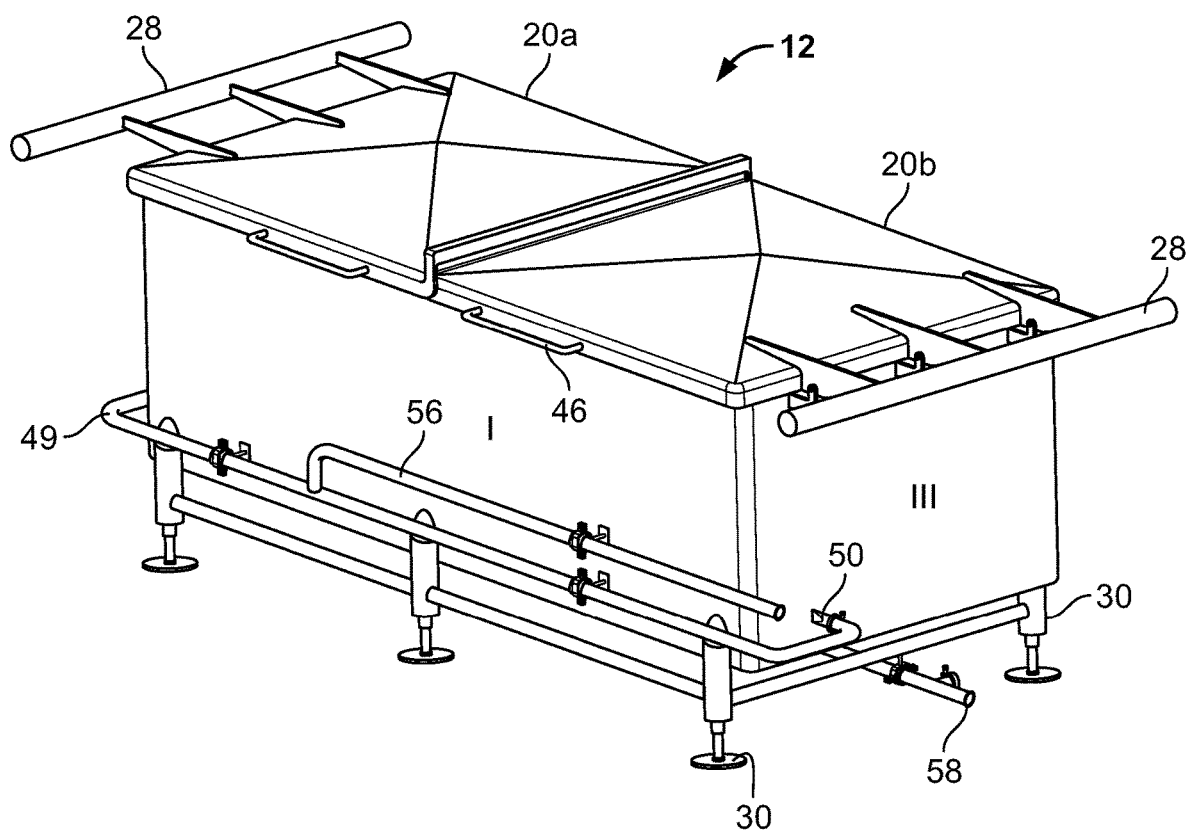
FIG. 1 illustrates a perspective view of one embodiment of brewing tank in a closed position.
Figure 2:
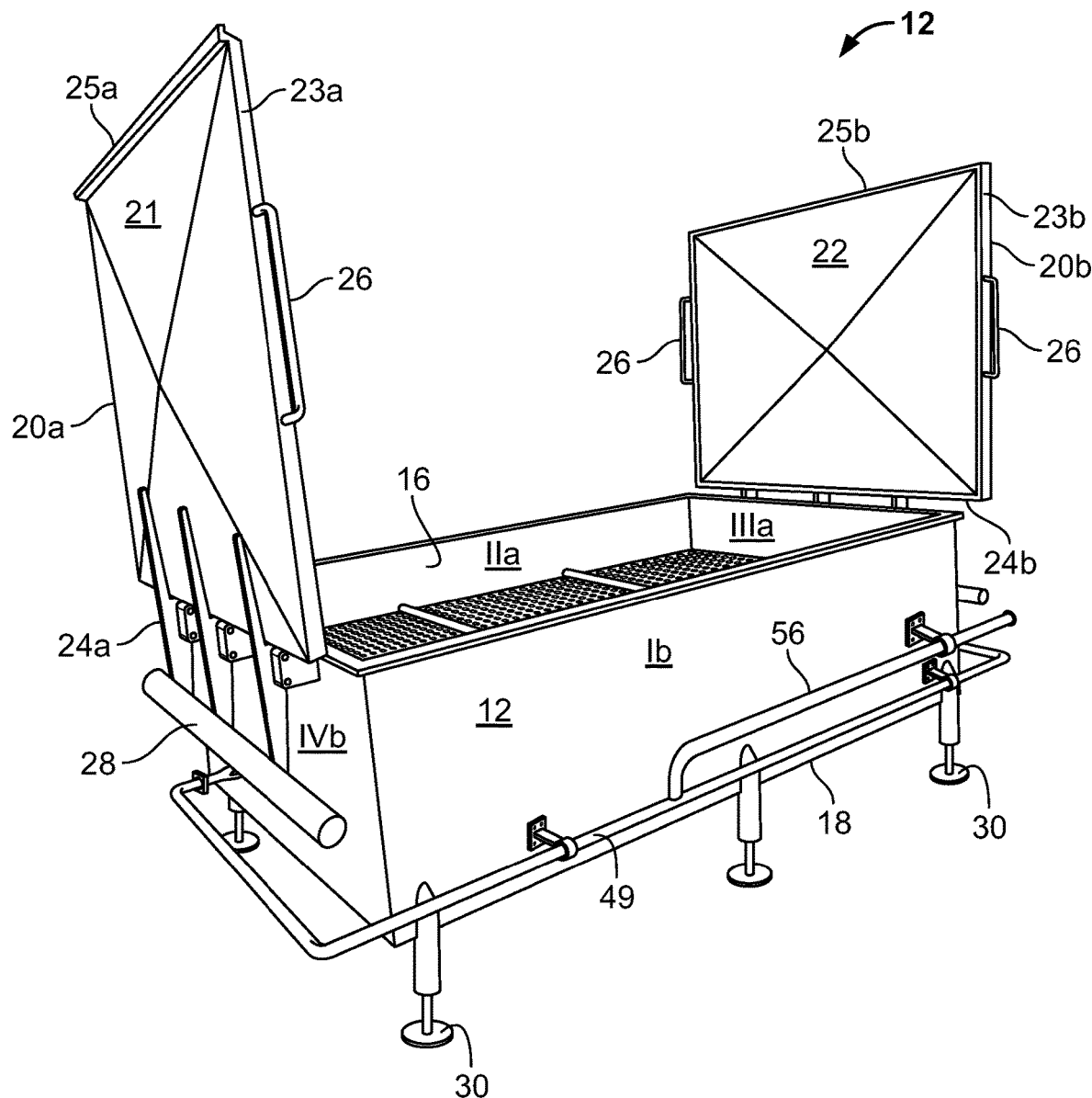
FIG. 2 illustrates a perspective view of one embodiment of a brewing tank in an open position.
Figure 3:
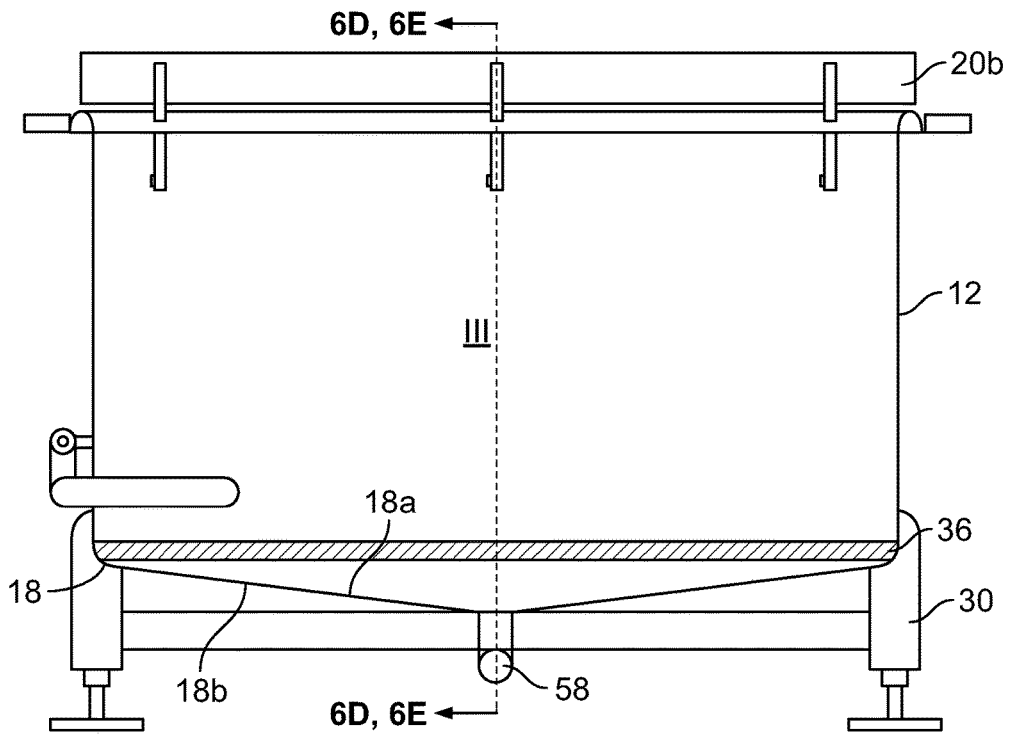
FIG. 3 illustrates an end view of one embodiment of a brewing tank in a closed position.

As FIGS. 1 and 2 illustrate, a single tank body 12 may have a rectangular tank body with a first elongated side I, and a second elongated side II, each elongated side having an inner surface Ia, IIa and an outer surface Ib and IIb; a first short side III, and a second short side IV each having an inner surface IIIa, IVa and an outer surface IIIb and IVb, a top opening 16, and a bottom panel 18. Thus a tank body 12 is defined by a first elongated side I, a second elongated side II, a first short side III, a second short side IV, and a bottom panel 18. As shown in FIG. 3, the bottom panel 18 may also have an inner surface 18a, an outer surface 18b, a first portion and a second portion that are configured to slope downward from the first elongated side I and the second elongated side II toward a center portion of the bottom panel 18. Thus, the bottom panel 18 of the tank body 12 may have a V-shape. This particular design of the bottom panel 18 of the tank body 12 facilitates easy drainage of liquid through the outlet 58 disposed at the center portion of the bottom panel 18 of the tank body 12. It may be apparent to one skilled in the art that any suitable design of the tank body 12 that facilitates easy drainage of liquid from the tank body 12 may be used.

Referring again to FIG. 1, the top opening 16 of the tank body 12 may be covered with a first lid portion 20a, and a second lid portion 20b. The first lid portion 20a, and the second lid portion 20b may be pivotably connected to the first short side III of the tank body 12 and the second short side IV of the tank body 12, respectively so that the lids can open or close. As also illustrated in FIG. 2, each lid portion 20a and 20b, may be pivotably attached through side 24a or 24b of the lid 20a or 20b to the first III or second short side IV of the tank. Each lid portion 20a and 20b may also include a free opposing lockable surface 25a or 25b. The first and second lid portions 20a and 20b may be pivotably attached to the tank body 12 through known means in the art, such as, but not limited to a hinged mechanism. As also illustrated in FIG. 2, the hinged mechanism may further include a rod shaped handle 28 disposed on each short side of the tank lid 24a. The rod shaped handle 28 may serve to keep the lids open and locked at a 90-degree angle during the loading or unloading of the coffee bags in the tank body 12. Although the tank lids 20a and 20b in this embodiment are separately hinged to the short sides, III and IV of the tank body 12, it may be apparent to one skilled in the art that other configurations, such as but not limited to a single lid or double lids capable of sliding over the tank body 12 may also be used.

Figure 4:
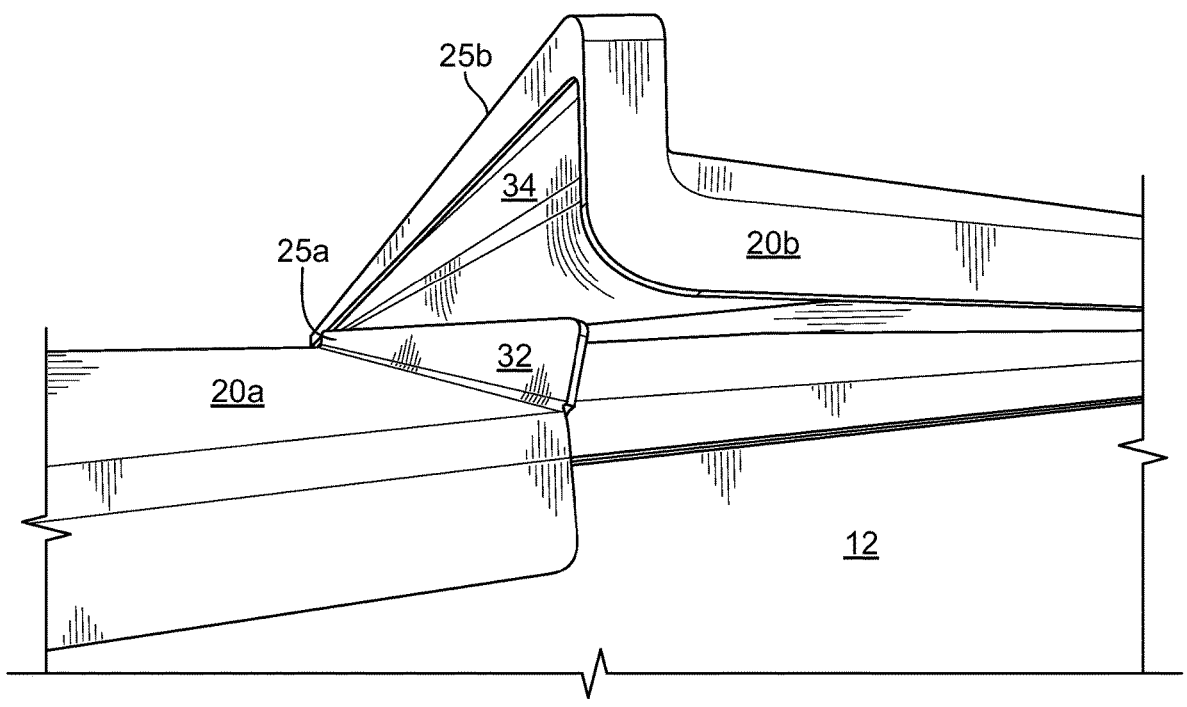
FIG. 4 is an illustrative side view of the lids of a brewing tank illustrating the lockable edges.
Figure 5:
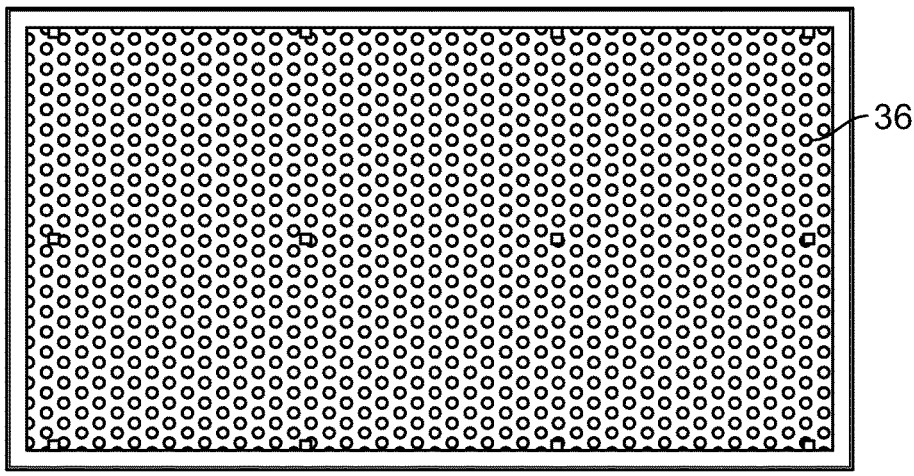
FIG. 5 illustrates a top view of a perforated bottom plate within a brewing tank.

FIG. 4 illustrates the lockable surface 25a of the first lid portion 20a and 25b of the second lid portion 20b that are capable of being locked together when the lids of the tank are closed. The locking may be facilitated by an upwardly projecting surface 32 of the first lid portion 20a with an inwardly curved surface 34 on the second lid portion 20b. This configuration allows the lids to stay locked during a steeping operation and prevent external contaminating liquid to enter the tank. It may be apparent to those skilled in the art that any other art known means in the art may also be utilized to prevent external liquid to enter the tank body 12, such as for example, with a seal.

Figure 2A:
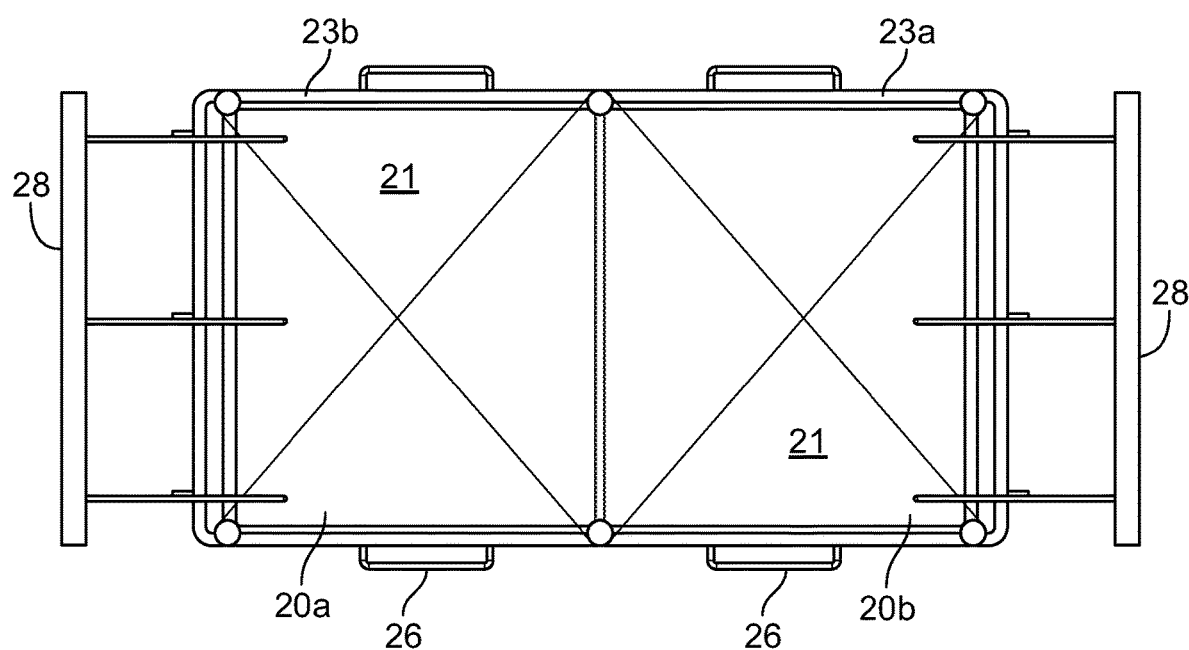
FIG. 2a illustrates a top view of one embodiment of a brewing tank in a closed position.

In addition to the short sides 24a and 24b of the lid portions 20a and 20b being pivotably attached to sides III and IV of the tank body 12, the first and the second lid portions 20a or 20b may also have an upper surface 21, an inner surface 22, and at least one lateral surface 23a or 23b (shown in FIGS. 2, and 2a). The upper surface 21 of the first and second lid portions 20a and 20b may slope upwards from the elongated sides I and II, and short sides III and IV, of the tank body 12 toward the center of the lid to form a shape like a pyramid (seen in FIG. 2). The inner surface of the lid, on the other hand, may be shaped like an inverse pyramid (not shown). The specific design of the lid surfaces, especially the upper surface 21 in the shape of a pyramid, allows any spilling liquid to slide off of the tank and prevent accumulation for standing water on the surface of the tank. Because the pyramid shape of the upper surface of the first and second lid portions prevents water accumulation on the surface of the tank body 12, this feature in the disclosure is also referred to as a rain-proof surface. On each lateral surface 23a and 23b of the lids, at least one handle 26 may be disposed on opposing sides to allow personnel to open the lid before a steeping operation (see FIG. 2 or 2a) or close the lid during the steeping operation. The handles 26 may have any suitable shape, including but not limited to a rectangular shaped handle, as shown in FIGS. 1-2.

The tank body 12 may further be held stable on the ground by means of at least three supports or feet 30 on each long side of the tank body 12 i.e., I or II (shown in FIGS. 1-3). Each support 30 may be about 12 inches tall from the ground. It may be apparent to one skilled in the art that other mechanisms such as but not limited to suction pads or any other known means may be used to provide stability to the large vessel used for the disclosed cold brewing process.

In this embodiment, the system may also include a permanently suspended perforated flat plate or a false bottom 36 (FIG. 5) disposed above the inner surface of the bottom panel 18 of the tank body 12. As illustrated in FIG. 3, the false bottom 36 may be positioned in such a way that there is at least half to one-inch gap between the false bottom 36 and the center portion of the bottom panel 18 of the tank body 12. During a steeping operation the false bottom 36 serves to hold the coffee bags. While the false bottom 36 may be permanently attached in this embodiment, it may be apparent to a skilled person that it can also exist as a removable and/or a disposable part of the tank body 12.

Figure 6A:
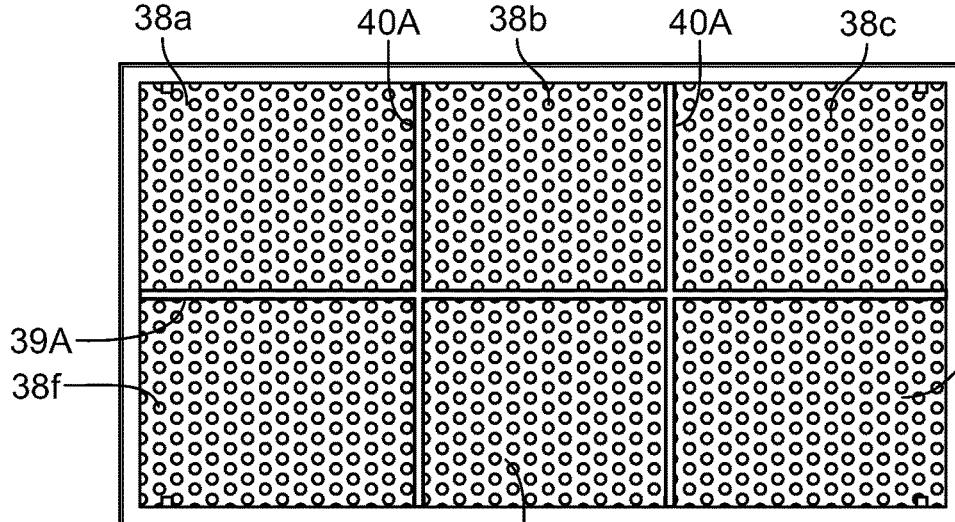
FIG. 6A is a top view of a perforated bottom plate and compartments within a brewing tank.
Figure 6B:
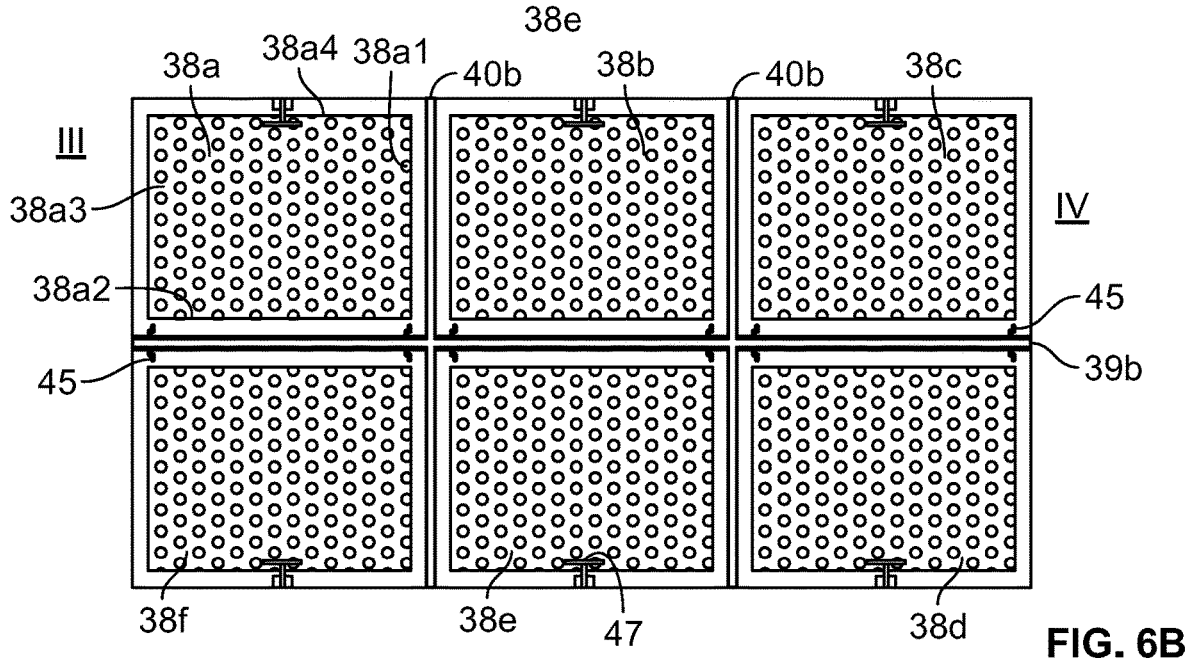
FIG. 6B is a top view of the compartments in a closed position within a brewing tank.

FIG. 6A illustrates a disclosed brewing tank 10 having at least about six equal sized perforated compartments, 38a-f to hold a total of about 96 coffee bags within a tank body 12. It may be apparent for one skilled in the art that the number of compartments may be adjustable in another embodiment. Similarly, the number of coffee bags placed within a single compartment may also vary.

Figure 6C:
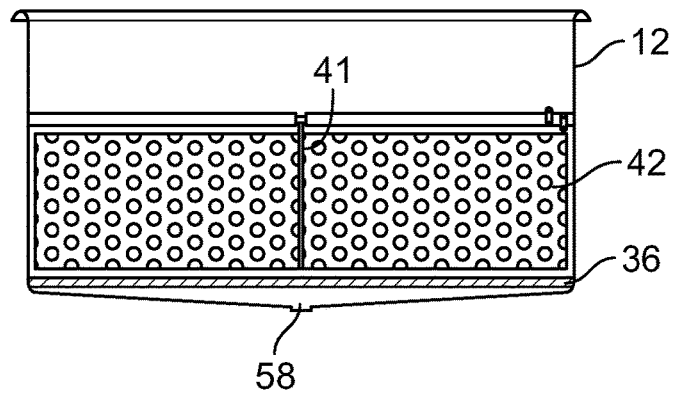
FIG. 6C illustrates a cross-sectional end view of a perforated compartment taken along line 6C-6C of the tank shown in FIG. 10A.
Figure 6D:
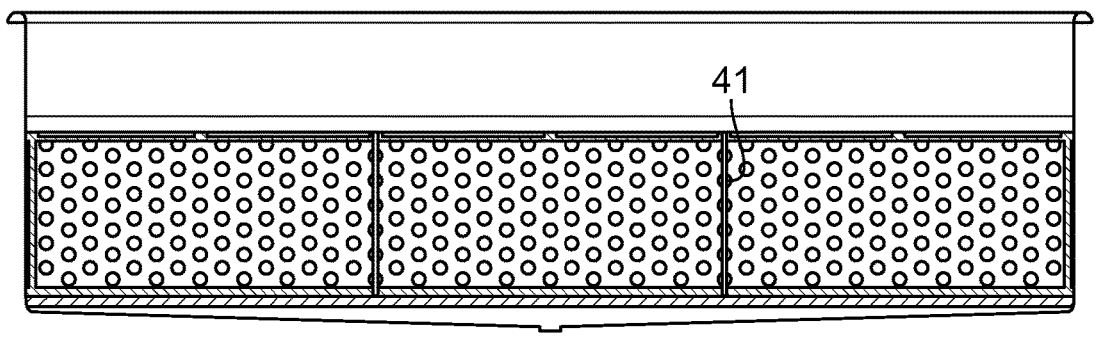
FIG. 6D is a cross-sectional view of a brewing tank taken along the line 6D,6E-6D, 6E of the tank shown in FIG. 3
Figure 6E:
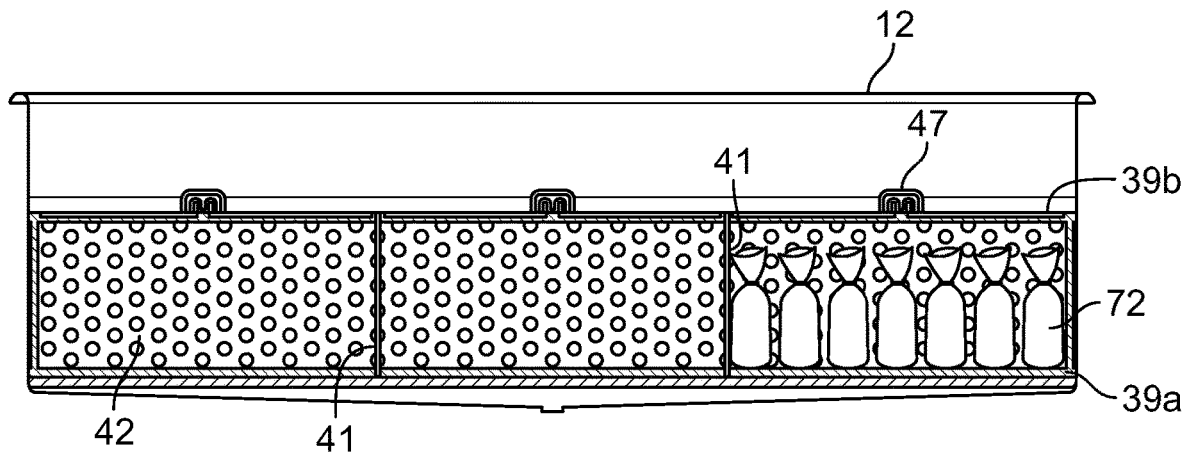
FIG. 6E is a cross-sectional view of a brewing tank taken along the line 6D,6E-6D, 6E of the tank shown in FIG. 3, and illustrating coffee bags within a compartment.

In one embodiment each compartment may have dimensions suitable to hold at least about 13-15 coffee bags. The perforated compartments 38 a-f shaped like a cube in a three-dimensional view, are formed by the dividers or steel rods 39a, b and 40a, b (shown in FIGS. 6A, B) that form the skeletal framework for the compartments (also referred to as cages, or cubes, or baskets) within the tank body 12. The dividers for example, may extend lengthwise from side III to side IV of the tank body 12 along the center of the false bottom 36 of the tank in a first position 39a, and two other dividers may extend widthwise from side I to side II on the false bottom 36 of the tank in a second position 40 *a*, to create equal sized squares on the false bottom 36 of the tank body 12 (FIG. 6A). These dividers 39*a* and 40*a*, provide the bottom framework for the compartments. At least two vertical dividers 41 that may be about 17 inches tall may extend from the divider 39*a* along the height of the tank (shown in FIG. 6C) to provide the framework for the depth for each of the six perforated compartments 38*a-f*. Further identical dividers 39 *b* and 40 *b* (shown in FIG. 6B), that mirror the position of the bottom framework may be formed over the vertical dividers 41, to provide the top framework for the compartments 38*a-f*. Once the skeletal framework for the perforated compartments are formed, a plurality of perforated walls 42 that extend vertically between the bottom dividers 39*a* and 40*a* and the top dividers 39*b* and 40*b* in the tank body 12 may be formed to complete the formation of the perforated compartments 38 in the tank body 12 (FIGS. 6C, 6D and 6E). The perforated compartments 38 *a-f* are thus defined by the false bottom 36 forming the bottom surface for each compartment, the perforated sides or walls for each perforated compartment, and the inner surface of tank body 12 (i.e., Ia, IIa, IIIa and IVa). For example, perforated compartment 38*a*, shown in FIG. 6B may have two vertical perforated plates 38*a*1 and *a*2 serving as walls along the center, while the inner surface of tank side II and IV will form the other two walls 38*a*3 and 38*a*4. For perforated compartment 38 *b* on the other hand, the inner surface of tank side II will form one wall 38, while the other three walls will be formed by the vertically disposed perforated plates. It will be apparent to one skilled in the art that constructions similar to 38*a* or 38*b*, may be formed for the remaining compartments, 38*c-f*.

During a steeping operation the coffee bags may be placed inside each perforated compartment 38 (FIGS. 6E and 7) or may be placed in only few of the compartments.

In one embodiment, a door 44 for each perforated compartment may also be provided as a top surface. Each door 44 may be pivotably coupled to the divider 39*b* through any known hinged mechanism 45 (shown in FIG. 8), so that the doors 44*a-f* can each be independently opened by personnel towards the center of the tank (see open door of a compartment in FIG. 7), thus making it easy during the loading or unloading of the coffee bags. Each door 44 may also include a handle 47 to allow personnel to open the compartment door at the time of loading or unloading the coffee bags. To prevent the coffee bags from floating upwards when the tank is filled with liquid, the door 44 may further include any art known locking means 48 (FIG. 8). The doors 44 may be positioned least about 7 inches below the top 16 of the tank body 12. Although in this embodiment, each compartment a-f includes only the doors 44 as a movable part compared to the permanently welded parts such as the bottom surface (characterized by the false bottom 36) and the walls (characterized by the perforated walls or inside surface of the tank sides), it may be appreciated by a person skilled in the art that the permanently attached parts, namely the false bottom, and walls of the compartments, can also be designed as a removable and/or adjustable feature within a tank body 12.

Figure 9:
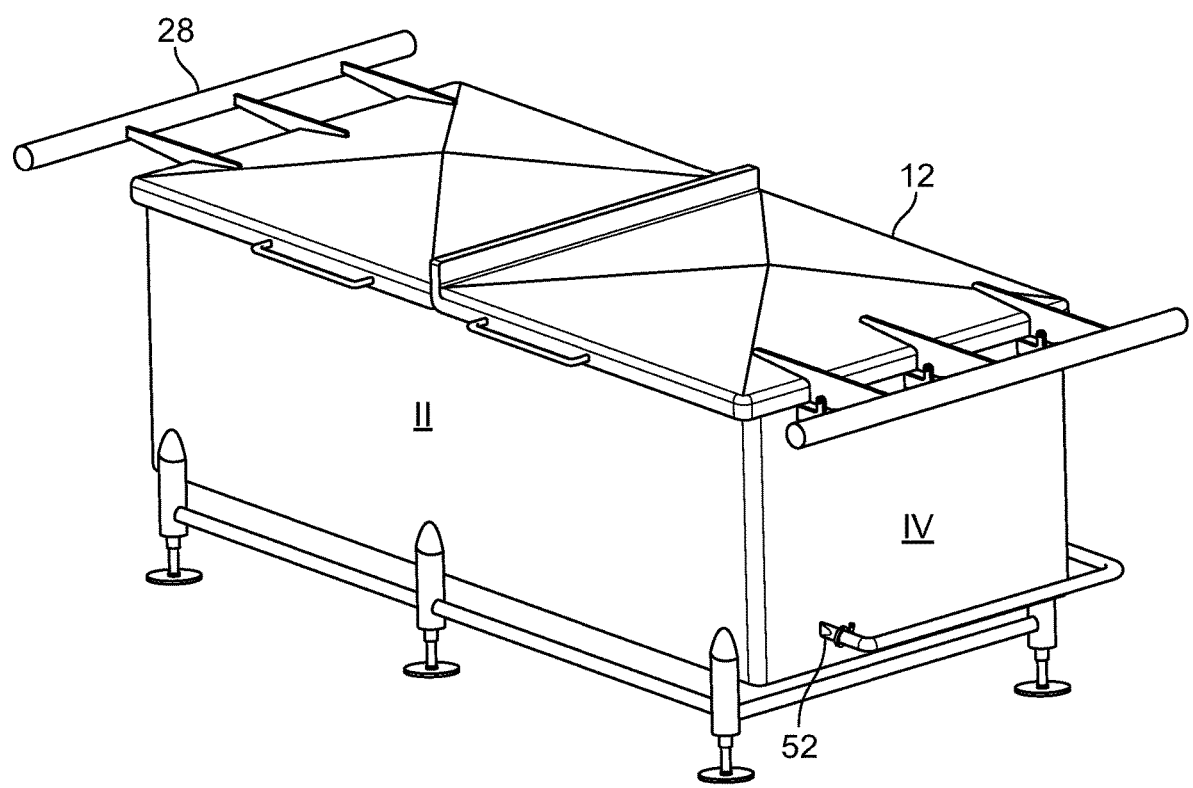
FIG. 9 is a perspective side view of a closed brewing tank showing details of sides II and IV.

A mild, non-turbulent recirculation of liquid within a tank body 12 may be enabled through a conduit or pipe 49, that extends between the short sides of the tank, i.e., III and IV (shown in FIG. 1). As shown in FIGS. 1 and 9, two inlets 50 and 52 may be disposed through each side III, and IV of the tank body 12 respectively, and may be positioned about 15 inches from the ground, and about 15 inches from one edge of side III or side IV. Each inlet 50 or 52, may include a nozzle 54. The nozzle 54 (FIGS. 1B-D) may be shaped to create sufficient velocity of liquid flow inside the tank body 12 (shown in FIGS. 10B and C), which is particularly useful when the tank is cleaned with a cleaning liquid such as, but not limited to, hot water, or water containing mild detergents after completion of a steeping operation. As it may be apparent to one skilled in the art, the tank body 12 may include any known flow regulating features in the art, such as valves, to regulate the liquid flow during or after the steeping operation.

Figure 10:
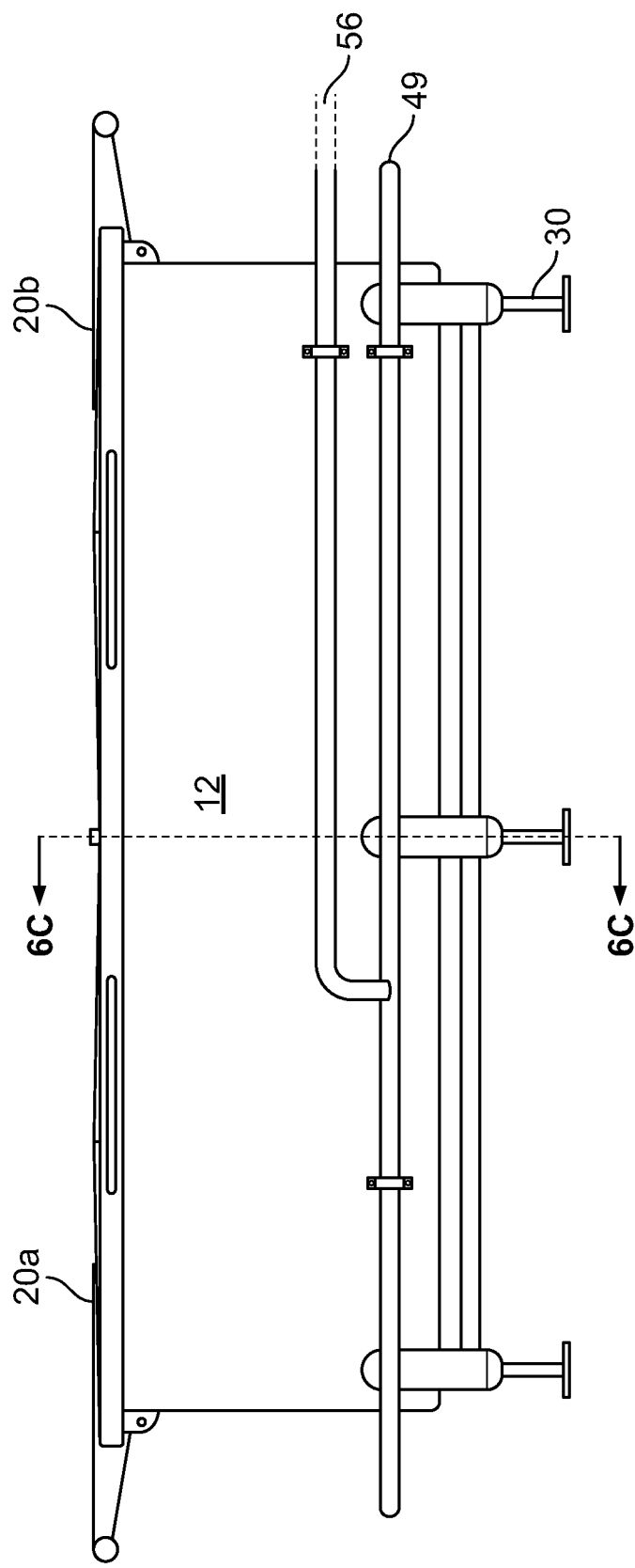
FIG. 10 B is a side view of one embodiment of a nozzle that may be coupled to a brewing tank inlet.

Typically, at the beginning of a steeping operation purified water may be pumped into the tank body 12, which is loaded with about 12-15 coffee bags in each compartment, through an external pipe 56 that is connected to pipe 49, as shown in FIG. 1, 9A or 10. The water flows inside the tank through both inlets 50 and 52 disposed on each side III and IV of the tank. Once the tank is flooded with water, which reaches about 2 to 5 inches above the compartment door 44 in tank body 12, a valve disposed in pipe 56 may be closed, thus allowing only recirculation of water to occur between the two inlets 50 and 52. This recirculation mechanism allows the steeping liquid inside the tank body 12 to be gently mixed during a steeping operation. After completion of a steeping operation, the steeping liquid or coffee extract may be pumped out through a single outlet 58 disposed at the bottom of the tank body 12 (shown in FIG. 3). Although in this embodiment the inlets 50 and 52 and outlet 58 are shown as stainless steel pipes, it may be appreciated by a skilled person in the art that that other known conduits such as but not limited to hoses may be detachably coupled to the inlets 50, 52 and outlet 58 of the tank body 12.

Figure 7:
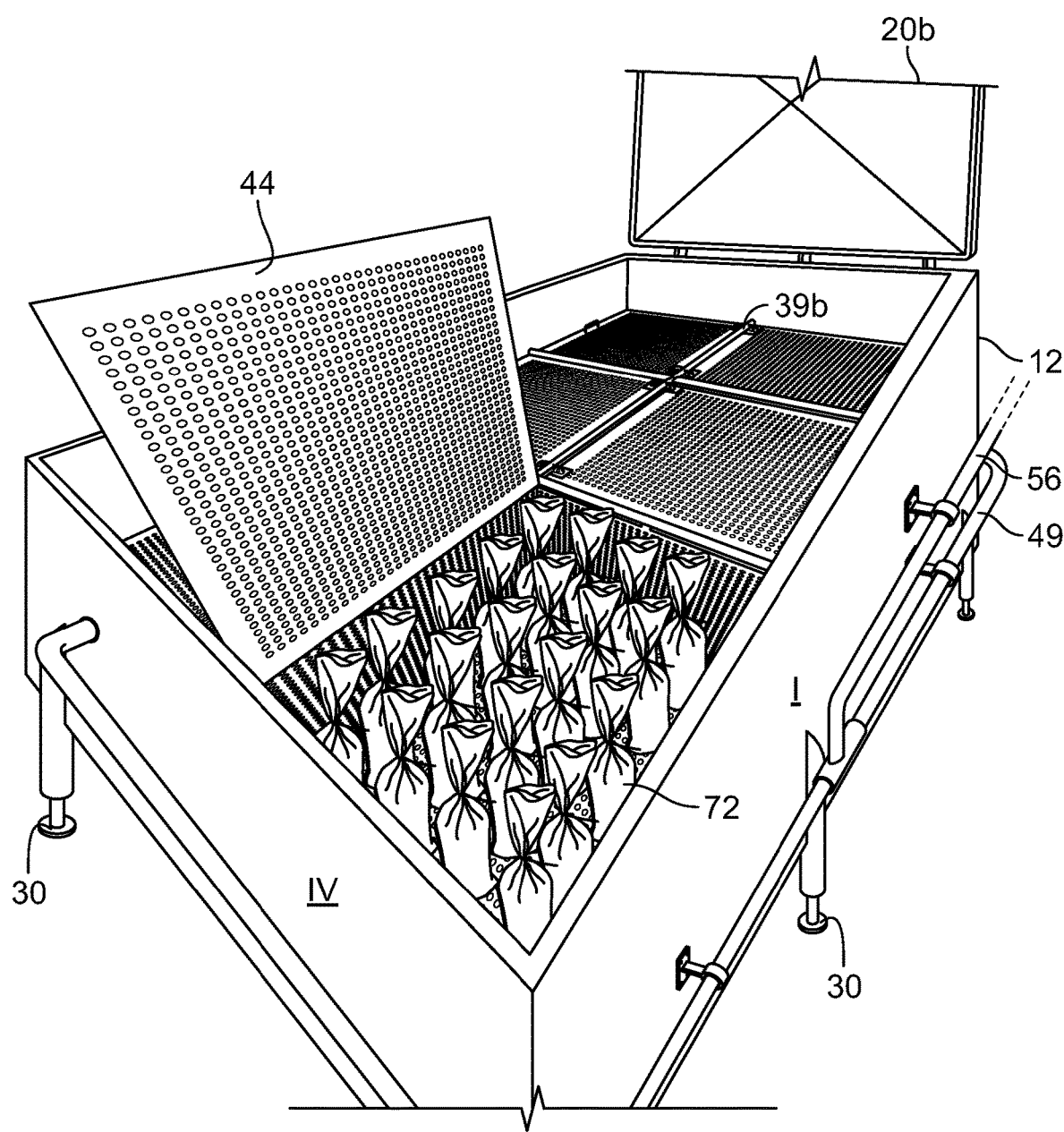
FIG. 7 is a perspective view illustrating the details of a single compartment within a brewing tank.
Figure 8:
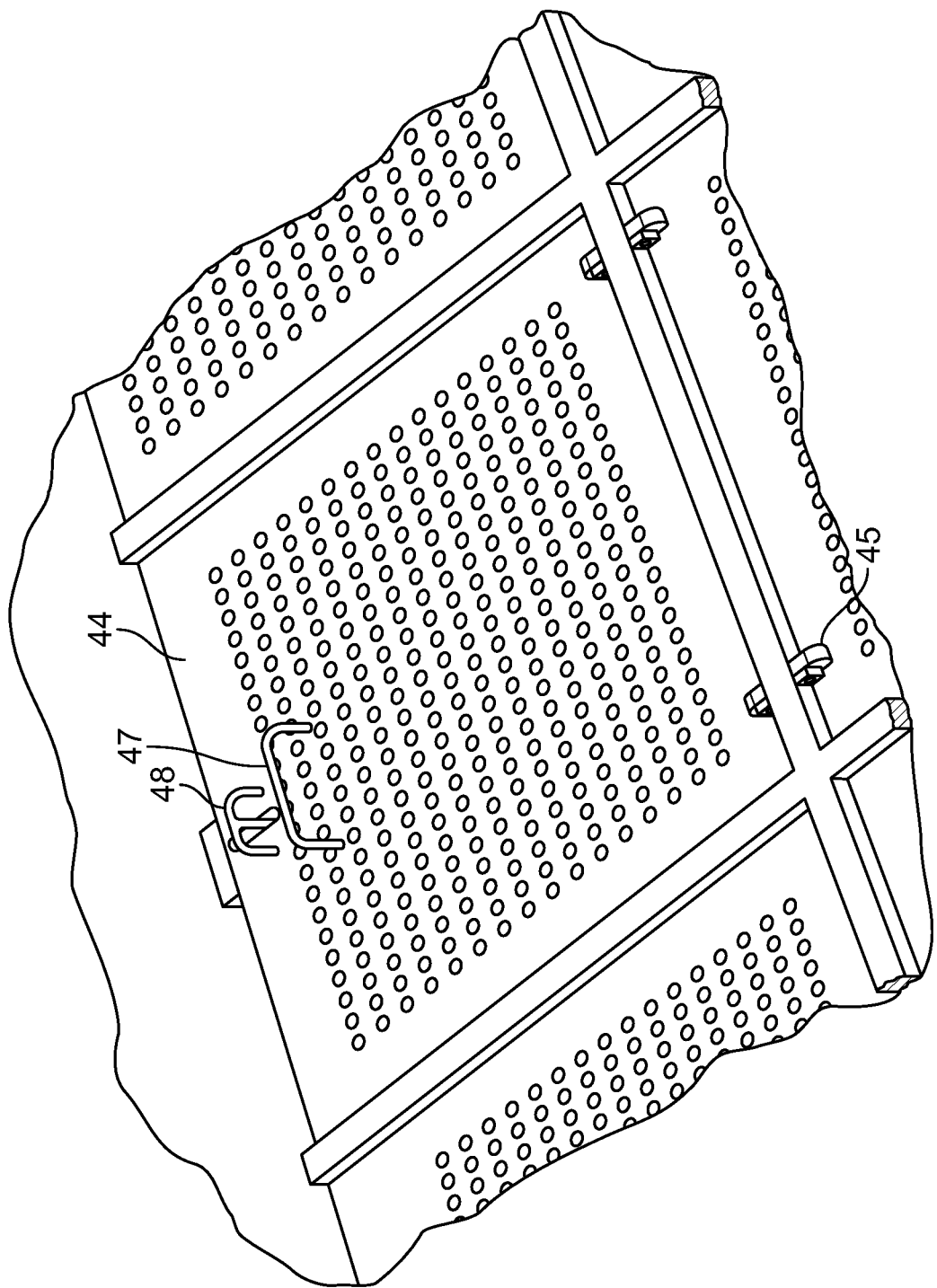
FIG. 8 is a top view illustrating the details of a single compartment door within a brewing tank.

As shown in FIG. 7, at the beginning of a steeping operation about 12-15 coffee bags containing the ground coffee and weighing about 13 lbs may be loaded into the tank body 12. Although in this embodiment the bags 72 are shown as positioned vertically with the draw strings 72*a* facing the door 44, it may be apparent to persons skilled in the art that any other suitable configuration such as stacking the coffee bags 72 horizontally over one another, or placing individual coffee bags 72 within a single cell formed within a compartment, may be employed in the disclosed process.

The coffee bags 72 may be spaced within the compartments 38 in such a way that the liquid within the tank can thoroughly wet each bag 72 and also easily be filled and emptied from one or more sources from one side of the tank to the other. It may be apparent to one skilled in the art that any mechanical apparatus which keeps the coffee bags capable of being segregated by one or by groups such that not all coffee bags congregate together and the bags are kept submerged and surrounded by liquid is acceptable.

After loading all the compartments, the door 44 may be locked to keep the bags 72 in place and prevent them from floating atop the compartments 38. The tank lids 20*a, b* may be secured and the tank body 12 may be flooded with liquid (purified water) via pipes 49 and 56. Once the tank body 12 is filled with the liquid, as indicated by a flow meter (not shown), a valve in pipe 56 is closed so that the liquid within the tank now recirculates from side III to side IV via pipe 49. The steeping operation may last about 12-18 hours to form a coffee extract. After the steeping operation, the coffee extract may be collected in totes 88 (shown in FIG. 14), or may be subjected to additional processing, or may be pumped through outlet 58 to a fresh tank.

As FIG. 11 illustrates, a series of tanks 14 that may be used for a large scale cold brewing operation described in this disclosure. The series of tanks 14 may all be of the same size and capacity, or in another embodiment may differ in size and volume. The series tanks 14 may be interconnected by a pipe system 62 that includes valves 64, or any known methods to enable regulation of liquid flow between the tanks. The circulation of liquid within a tank body 12 or between series of tanks 14 are generally powered by a motor assembly 66.

Process for Making Cold Brew Coffee

The process of the present disclosure is suitable for brewing all types of roasted coffee beans including light, medium, medium-to-dark, or dark roast but preferably 'medium-to-dark' or 'dark' roast because of their higher pH. Although many roasters may have specialized names for their favored roasts, due to a lack of industry standardization the roasts are generally defined based on the duration of the roast. So a lighter roast may be beans obtained after roasting the beans for a shorter duration, while the medium or dark roasts may be obtained by roasting the beans for an increasing amount of time. The roasts however may generally be identified by their appearance and taste as outlined by the National Coffee Association (NCA). For example, of the traditional three roasts the 'lighter roast' coffee possess a light brown color and has no oil on the surface of the beans compared to the slightly darker brown colored 'medium roast' or the dark to almost black 'dark roast' coffee where oils can be seen on the surface of the coffee beans. The lighter roasts may also have the highest acidity compared to the medium or medium-to-dark or dark roast coffee because the chlorogenic acids in the light roast coffee are not completely broken down. On the other hand, the medium and medium to darker roasts are less acidic compared to a lighter roast coffee because the roasting process facilitates maximal to complete breakdown of the chlorogenic acids in the coffee beans depending on the roast level. Accordingly, the medium to dark roasts are less acidic and more palatable.

Figure 12:
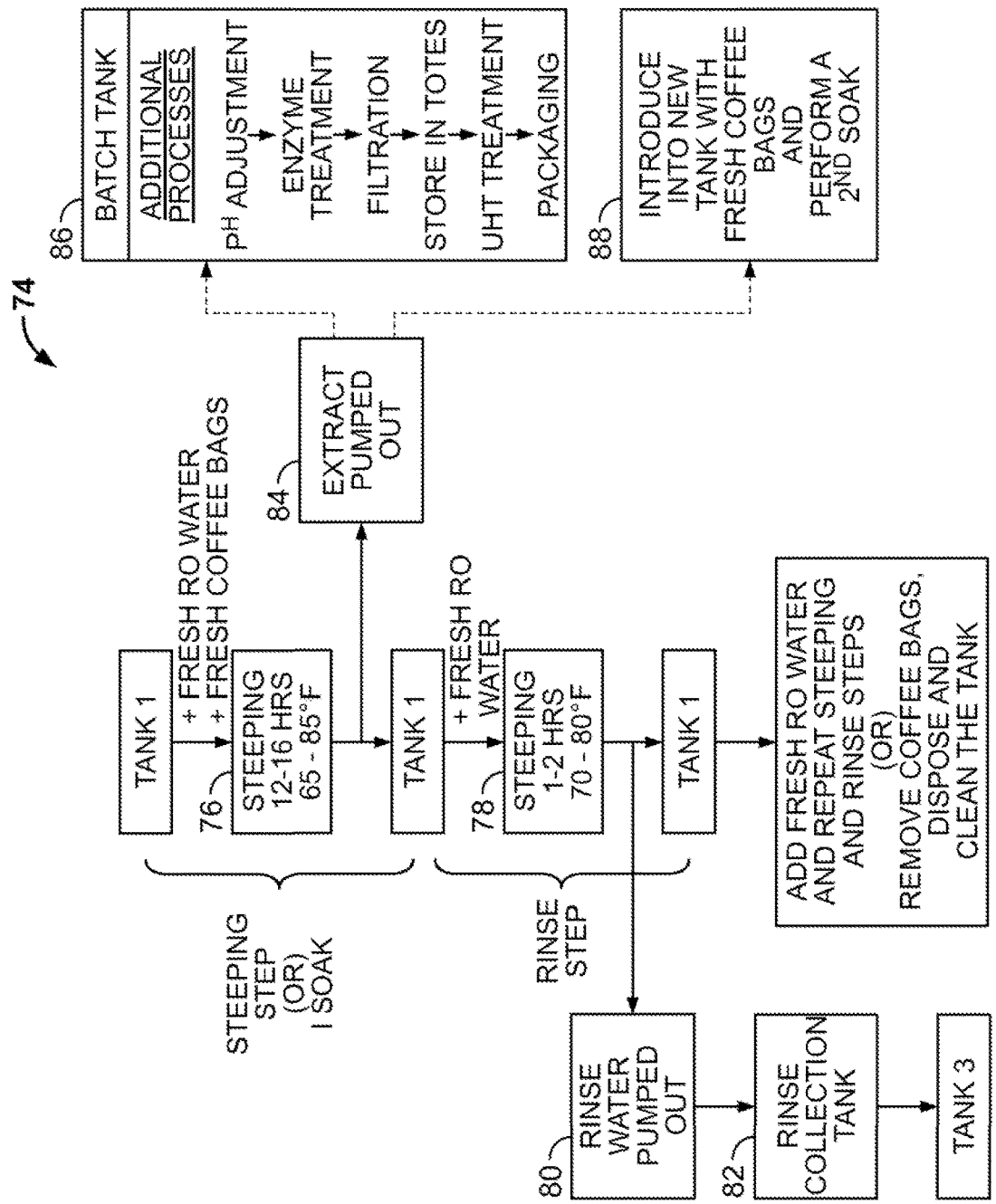
FIG. 12 is a schematic representation of a cold brew process with a single soaking step.

FIG. 12 illustrates a process 74 for cold brewing coffee using the disclosed brewing system 10. The process comprises the steps of: (i) providing at least one filter bag, (ii) adding an infusion material to the at least one filter bag, and subjecting the at least one filter bag of infusion material to at least one first steeping step for at least first duration of time to form a first beverage extract, (iii) removing the first beverage extract, and (iv) exposing the at least one filter bag of infusion material to fresh purified water in order to perform a second steeping step for at least a second duration of time to form a rinse beverage extract.

The steeping process in general may include filling a water permeable filter bag with infusion material such as tea leaves or coarsely ground coffee beans. The coarsely ground coffee beans may be a commercially available medium roast or medium-to-dark coffee roast and may be selected from a group including but not limited to Ethiopian Sumatran or Colombian coffee grounds. The filter bag may be any traditional tea or coffee bags, pouches, packets, sachets, packages and may be made from a porous non-woven fabric, woven fabric, or one or more sheets of filter paper or food grade plastic or nylon or made of any known material with filtering qualities. The filter bag may exist in any suitable shape including but not limited to a rectangle, circle or bottle shaped. The bag may have high wet strength and filtering qualities to prevent passage there-through of the fine dust from the tea leaves or coffee grounds. The filter bag may also be commercially available, such as the felt filter bags from McMaster-Carr, having a large surface area for high particle holding capacity. These felt filter bags may typically fit about 15 to about 30 lbs of infusion material or beverage, such as the coffee grounds or tea leaves, and may have a diameter ranging from about 14 to about 24 inches and a height ranging from about 18 inches to about 34 inches. The felt filter bags may be capable of filtering particle sizes ranging from about 1 micron to about 200 microns. As in a typical tea or coffee bag, the infusion material may be sealed within the bag by any known means in the art such as but not limited to drawstring with sewn seam to tie the bags to any pipe or hose or rod.

Figure 13:
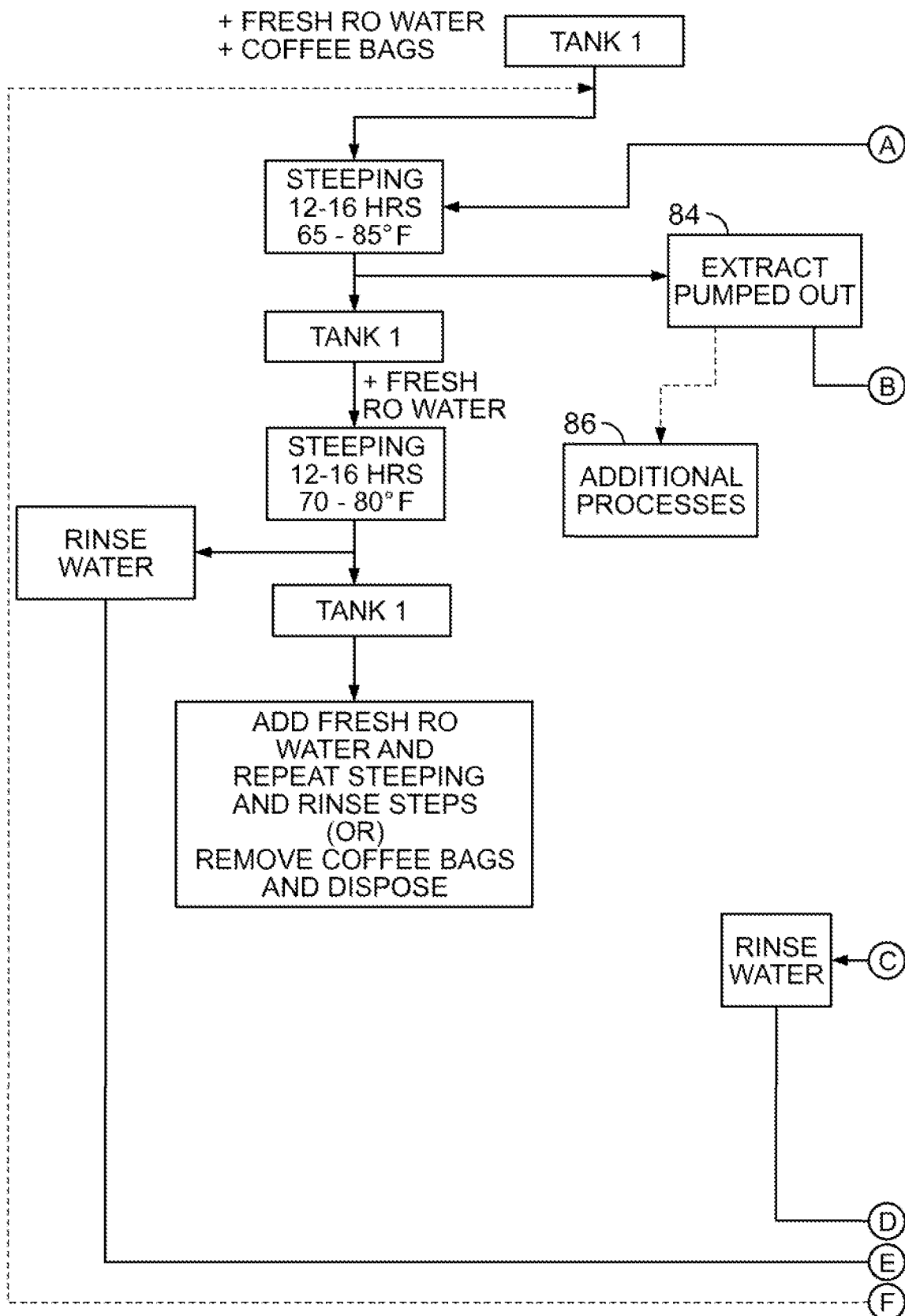
FIG. 13 is a schematic representation of a cold brew process with a double soaking step.
Figure 13:
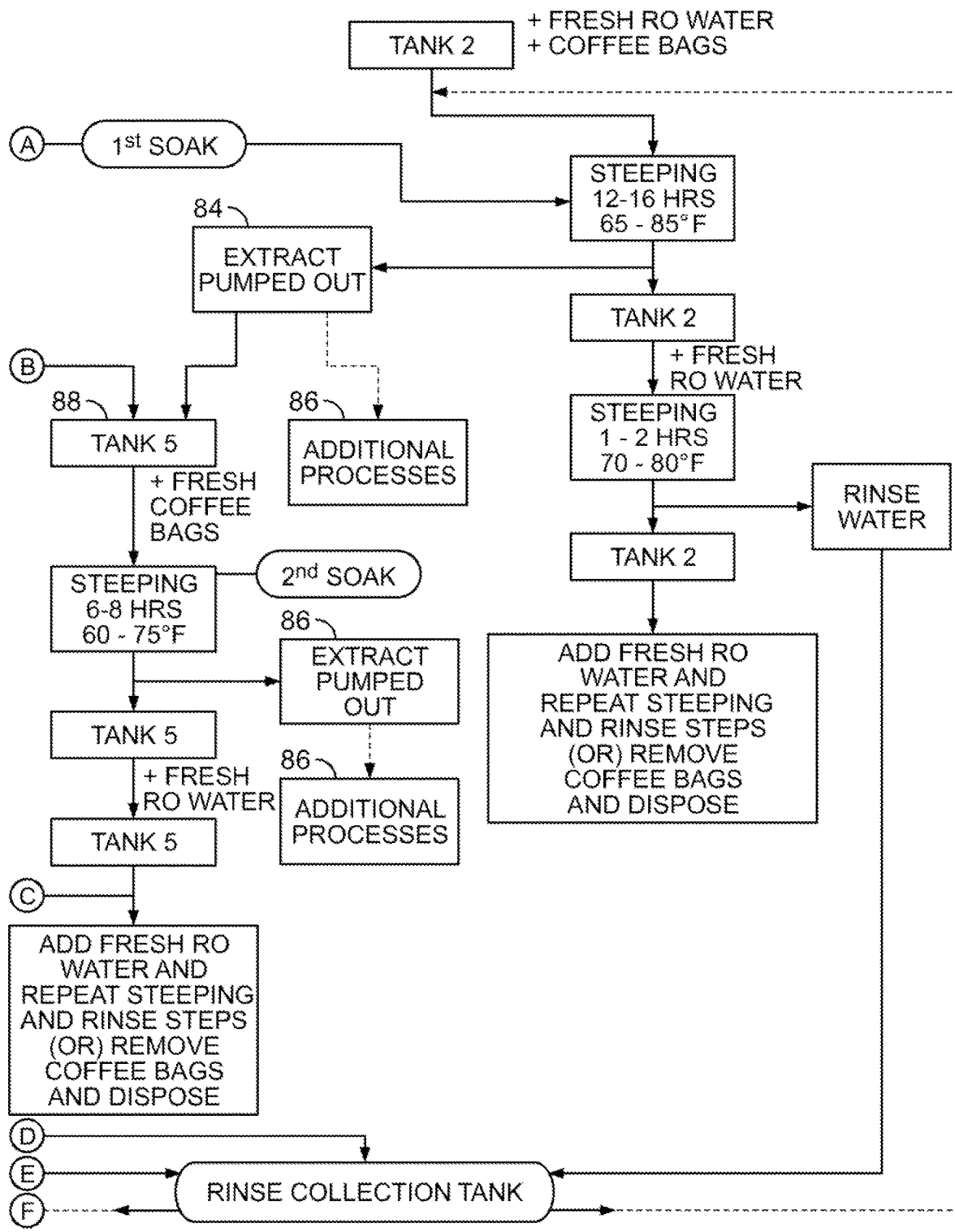
Figure 14:
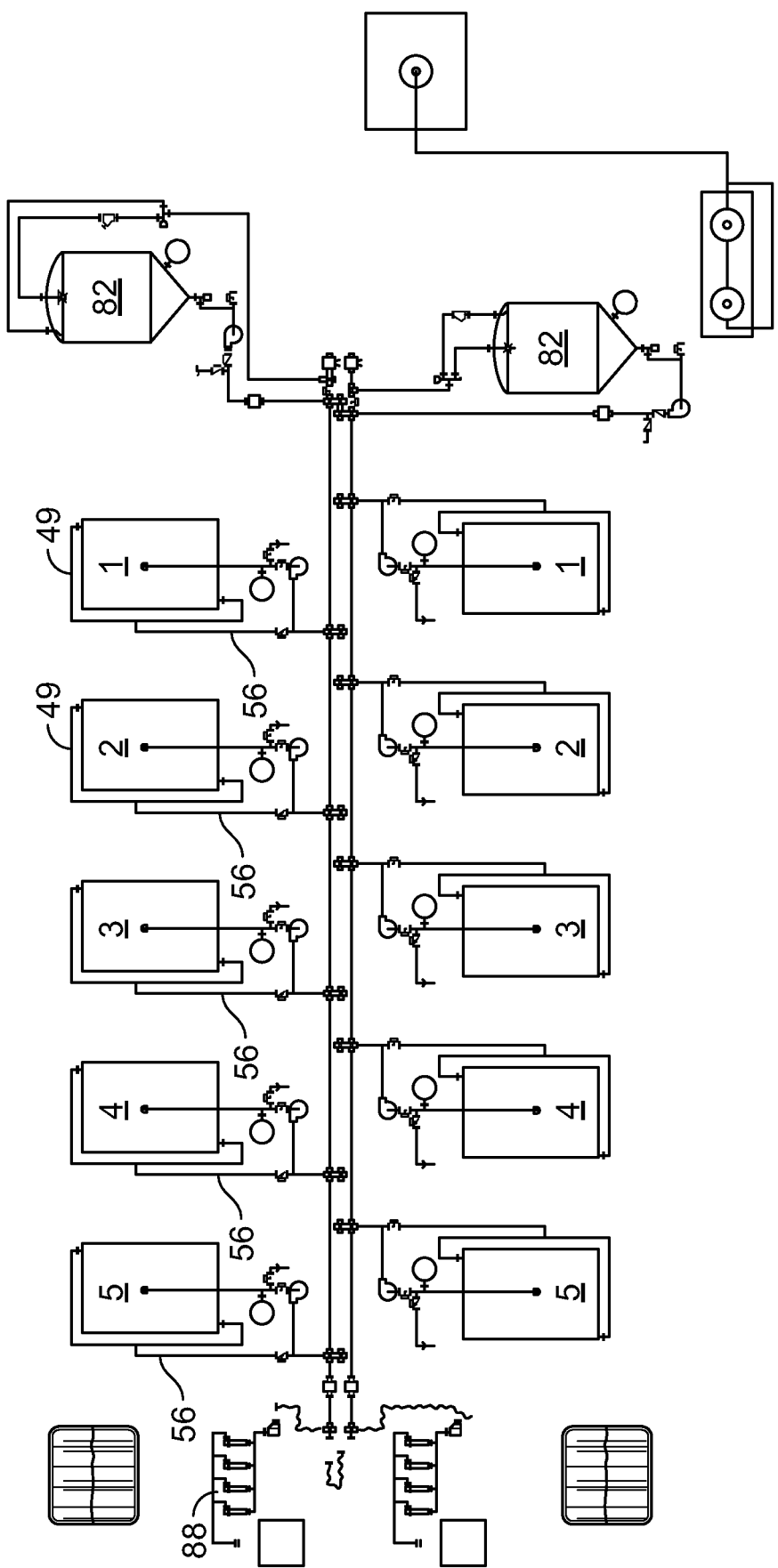
FIG. 14 is a diagram representing a large-scale cold brewing process.

In one embodiment, a known amount of infusion material ranging from about 13-15 lbs. may already be placed in a bag 72 that is sealed. In another embodiment, about 80% of the volume of the bag may be filled with tea or coffee grounds and sealed just before use. Once the filter bags are filled with the infusion material or specifically coffee, the bags 72 may be placed inside the compartments 38a-f of a single disclosed tank body 12 (as shown in FIG. 1) or at least two tanks, tank 1 and 2, in a series 14 and flooded with purified water via pipes 56 and 49 (FIGS. 13 and 14). In another aspect, the bags 72 may be pre-soaked in or sprayed with purified water to render the bag and its contents sufficiently wet before loading into the tank body 12. Given the dimensions of the tank body 12, a single compartment 38 within the tank body 12 in one embodiment may hold about 12 to 15 bags and a single tank body 12 having six compartments, 38a-f, may hold about 72-96 bags in total per steeping operation.

The number of coffee bags loaded into a single compartment 38 in tank body 12 may also vary depending on the nature of coffee roast. For example, 12 bags of coffee may be placed in a single tank if the ground coffee is Sumatran, while 15 bags may be placed in each compartment if the ground coffee is Colombian black. Although the disclosed process describes loading all compartments of tank body 12 with coffee bags, one skilled in the art might recognize that fewer compartments may be loaded with coffee bags during a steeping process.

One skilled in the art would also understand that purification of water may be accomplished by any known means in the art including, but not limited to, reverse osmosis (RO). The purified water in general aids to clean out any contaminates larger than water molecules that may interfere with product quality such as taste, harmful impurities such as lead, arsenic nitrates, sodium, and bacteria that can be present in tap water. In one embodiment, the water in the steeping tank is maintained at ambient temperatures ranging from about 60° F. to about 90° F. during a steeping operation. In another embodiment, the water in the steeping tank may be below 60° F., such as cold refrigerated water or it may be above 90° F.

The amount of water in the steeping tank is generally about four times the amount by weight of the infusion material, such as coffee. In some embodiments the ratio of water to coffee may be about 3:1 or 2:1. The level of water in the tank body 12 may be maintained at least about 2 to about 10 inches above the compartment doors 44 in any given tank. Once the tank body 12 or series tanks 14 are filled with water, the valve in pipe 56 may be closed to begin recirculation of water via pipe 49 within a tank. The recirculation process may occur during an entire steeping cycle.

The steeping or soaking step may generally continue for time periods ranging from about 2 to about 20 hours. The steeping time may also be determined until a Brix level of about 15 or about 12 or about 10 or about 5 or about 1 is achieved or may be determined by the user depending on the roast and/or the amount of the solid material, or the number of bags. As illustrated in FIGS. 12 and 13, the duration of the steeping time may also vary when the disclosed brewing process includes more than one steeping step. For example, the duration of a first steeping step may typically last for about 12-16 hours (also referred to as "first soak"), while the duration of a second steeping step may last for about 1 to about 8 hours (also referred to as "second soak") (shown in FIGS. 12 and 13). In one embodiment, the first and/or the steeping step may be performed with fresh RO water or it may be performed with a rinse water obtained from a previous soaking process, or by adding a coffee concentrate or solids to fresh RO water until a brix level of about 1 is reached or the rinse water may be obtained from the inventory. Rinse water, as used herein refers to water that is obtained from a vessel after completion of a second steeping step. In another embodiment the first steeping step and/or the steeping step may be performed with a combination of fresh RO water, and rinse water.

After completion of the first steeping step or first soak, the coffee extract 84 from a single tank body 12 (as shown in FIG. 12) or from at least two tanks, i.e., tank 1 and 2 as shown in FIG. 14, may be pumped via the outlet 58 into a batch tank 86 for immediate processing with processing aids, such as but not limited to buffers for pH adjustment, enzymes for alleviating the sediment formation, pleated filter system to filter out the particulates, sediments, etc. Alternatively, the coffee extract 84 after the first soak may also be subjected to additional processes in the same tank 1 or 2 before pumping it to a bag-in-tote for cold storage at 40° F. or frozen until further processing, such as but not limited to UHT treatment and packaging. The coffee extract 84 (or "a first coffee concentrate") after a first soak performed with fresh purified water in a single tank (in FIG. 12 or Tank 1 or 2 in FIG. 13) may typically have a pH from about 4.5 and about 5.5, and a Brix level of about 3.5 to about 6.5. The batch tank 86 and the rinse collection tank 82 (shown in FIGS. 12 and 13) may each have a capacity to hold about 1000 gallon of liquid or coffee extract or extract pumped out of at least two tanks.

It is also envisioned that the coffee extract 84 after a first soak obtained from two separate tanks, i.e., Tank 1 and 2 as shown in FIG. 13 or 14, may be pumped into a third tank containing fresh coffee bags (for example Tank 5 in FIG. 13 or 14). Once the third tank (tank 5 in FIG. 13) is filled with the combined extract from Tank 1 and 2 instead of fresh RO water, a second steep step (also referred to as "second soak") may be performed for a duration of about 6 to about 8 hours at a temperature of about 60 to 75° F. The resulting extract 86 (or "a second coffee concentrate") that is obtained from two separate tanks (i.e., tank 1 and 2 in FIG. 13 or 14) may have a Brix level of about 7 to about 13. The Brix level of the extract is determined herein using Refractometer Model A21341-CC J-257. 12 VDC; 80W; SN 3964 from Rudolph Research Analytical, located at Hackettstown, N.J., USA. The Brix measurement may be made by the protocol that include the following steps:

Set Temperature
a. Press Temperature
b. Press Temp Control
  i. Select 25 C
Calibrate the equipment.
c. Press Zero
d. Screen will tell you to Place pure water of sample dish
e. Cover the eye of the sample dish with Water ACS grade.
  Make sure there are no bubbles.
  i. Water, ACS, Reagent Grade, ASTM Type CAT #9150-32 from RICCA
f. Click Done
g. Reading will appear on screen as Brix.
h. Equipment is now ready for testing.

Wipe the sample dish with a Kim Wipe to dry the equipment
Place sample to test on the eye of the sample dish
Select Measure
Record the reading When the coffee extract 84 is pumped out after the first soak or second soak, the tank 1 in FIG. 12 or tanks 1, 2 and 5 in FIG. 13 containing the coffee bags may be refilled with fresh purified water (RO water) again to perform a second steeping step for a second duration of about 1 to about 4 hours at a temperature of about 60 to about 70° F. This second steeping step with fresh RO water is characterized as a rinsing step. After completion of the second steeping step, the resulting rinse water 80 may then be pumped into a rinse collection tank 82. Alternatively, the rinse water 80 may also be pumped into a fresh tank that contains fresh coffee bags 72 (not shown) or into the same tank 1 or 2 (see FIG. 13 F) for another steep step.

The rinse water 80, obtained after a steeping step with fresh purified water may typically have a Brix level of about 1.5 (or "a third coffee concentrate"). It may be apparent to one skilled in the art that a coffee concentrate having greater than 1.5 Brix can itself be a "ready to drink" (RTD) product.

Alternatively, one may utilize the rinse water 80 having about 1.5 Brix as a steeping liquid in a fresh tank containing freshly loaded coffee bags, to obtain a coffee concentrate product with increased Brix levels. It may be apparent to one skilled in the art that a coffee concentrate having greater than 5 Brix may be diluted with water in a ratio of 2-parts water to 1-part coffee, a coffee concentrate having greater than 8 Brix may be diluted with water in a ratio of 4-parts water to 1-part coffee and a coffee concentrate having greater than 11 Brix may be diluted with water in a ratio of 5-parts water to 1-part coffee to form coffee concentrate products that differ in the Brix levels and hence may potentially be packaged after the disclosed cold brewing process in beverage cartridge having a volume fill capacity of up to about 100 ml or about 60 ml and sold as separate products. Although this disclosure describes a double-soak brewing process, it may be apparent to one skilled in the art that more soaking steps, i.e., a third soak or a fourth soak, can be performed to obtain a coffee concentrate with higher than 12 Brix.

A skilled person in the art may also appreciate the fact that unlike the traditional methods which increase the Brix levels by either adding solids to a coffee concentrate obtained by a cold or hot brewing process or combining extracts from cold brew and hot brew, the disclosed process is capable of providing a coffee concentrate of up to about 12 Brix, without any such additions.

Although the disclosed cold brewing process is less acidic compared to a traditionally brewed hot coffee, the pH levels of the steeped extract may still drop over time thus affecting the shelf life when stored at room temperature. For example, the cold brew extract may become very acidic (less than pH 5.2) after storage at ambient temperature for 8-12 weeks. So an extract obtained after the steeping process that is more alkaline may be ideal to extend the shelf life. Hence, the extract 84 or 86 may be treated with processing aids such as with buffers, enzymes, anti-foam materials, etc. after the brewing process. The buffer or alkaline treatment may include addition of one or buffers such as, but not limited to, potassium carbonate, potassium hydroxide and tri-potassium phosphate to render the steeped coffee extract more alkaline. While the alkaline treatment of the extract is generally performed after the steeping process, a person skilled in the art would understand that the addition of buffer may occur at any step of the brewing process. In some other embodiments, the buffer may be added just before the steeping step. In another embodiment, the buffer may be added after the steeping step.

The buffer, such as potassium carbonate, may be added in an amount ranging from about 0.35% to about 0.45% or until the pH of the product before packaging is between about 5.0 to about 7.0, or preferably from about 5.5 to about 6.8 or more preferably from about 5.95 to about 6.2. In some embodiments the amount of buffer added to the extract may depend on the kind of coffee roast. For example, since the dark coffee roast is less acidic it may require lesser amount of buffer. A lighter roast on the other hand may require more buffer compared to a medium or medium-to-dark roast or dark roast.

The increase in the pH levels of the extract may be achieved by simultaneously adding the buffer to the extract and measuring the pH of the extract using standard bench top pH meters at ambient temperature with liquid from the tank with no dilution or other treatment. In another embodiment, the pH of the extract is constantly monitored as the buffer is added to the extract in a tank. During this step, the extract may be recirculated in the tank. Since recirculation may cause undesirable foaming anti-foaming materials may be added to the extract before or after buffer treatment to prevent foaming. It is contemplated to add anti-foaming materials or defoamers as another processing aid such as, but not limited to, silicone antifoams to the steeped extract before further processing. In one embodiment Xiameter AFE-1510 may be added to prevent foaming during subsequent processing of the extract. The amount of anti-foaming material added to the extract generally does not exceed more than about 90 ppm. After addition of buffers and anti-foaming materials, the extract may be transferred to a larger batching tank with about 1,500-gallon capacity.

The process of this disclosure may also include the step of treatment the coffee concentrate with enzymes as a processing aid to prevent sediment formation. Accordingly, one or more enzymes including but not limited to pectinase, hemicellulase, cellulose, galactomannanase, endo-1-4-beta-Mannanase, alpha-galactosidase, pectin lyase, polygalacturonase, rohapect B1L and may be added at a range of about 0.5% to 3.0% w/v and v/v to the extract to reduce sediment formation. The extract may be filtered before or after the alkaline and enzyme treatment. It may also be apparent to one skilled in the art that the filtration step may be optional, if the enzyme treatment reduces the formation of sediment in the concentrate to a desirably low or negligible level.

The cold brew process of this disclosure may also include the step of ultra-high temperature (UHT) treatment of the concentrate. This may be performed in tubular indirect exchangers where the extract is subjected to a temperature of about 100° F. to about 300° F. or higher for less than about 40 seconds, and preferably for less than about 20 seconds or less than about 10 seconds and more preferably for less than 3 seconds. The UHT treatment of the concentrate may bring the pH of the extract down by 0.1 to about 0.3, but the overall pH of the product may still be less acidic compared to the acidity of the extract after the steeping process and/or before the alkaline treatment. The presence of buffer added to the extract also prevents further drop in the pH levels during this UHT treatment. It may be apparent to one skilled in the art that the concentrate before or after packaging may also be subjected to a standard retort sterilization process.

The concentrate from the UHT process may then be directed to a holding tank and the concentrate may or may not be subjected to agitation at this stage. The overhead space of the tank may be filled with nitrogen flowing into the tank via pipes to prevent further oxidation of the final concentrate.

The resulting final concentrate or product that is buffer treated and has a pH from about 5.5 to about 7.0 or preferably from 5.95 to 6.8 may then be packaged aseptically in a beverage cartridge, or container, or bottles of any size. The container or cartridges or bottles may include HDPE bottles, plastic cups or Keurig K-cups, multi-layer cartons, etc. In one embodiment, the concentrate may be aseptically packaged in a beverage container, such as a K-cup, that may hold up to about 100 ml of liquid, or less. The final concentrate may also be packaged in multi-layer cartons or pods or bottles that may hold about up to about 75 ml, or up to about 60 ml of liquid. In another embodiment, the beverage container may hold at least about 62 ounces to about 65 ounces of concentrate or ready to drink beverage.

The concentrate aseptically packaged in suitable cartridges may be shelf-stable (i.e., the concentrate has a stable pH of 5.5 or above, or the same pH achieved before packaging) and may additionally possess the characteristic smoothness of cold brew beverages with fresh flavor and may have a prolonged shelf life of more than 6 months but less than 14 months.

The shelf-stable concentrate packaged in a suitable beverage cartridge may subsequently be mixed with about 4 ounces or up to about 12 ounces of hot or cold liquid to form a ready-to-drink coffee beverage. In another embodiment, the concentrate may also be packaged without an aseptic treatment and stored at cold temperature (at or below 4° C.) before it is mixed with hot or cold liquid to form a ready-to-drink beverage. It may be apparent to one skilled in the art that the beverage container may have a lid or cover that may be peeled off or punctured before the concentrate is mixed with a hot or cold liquid to form a ready-to-drink coffee beverage.

Example 1

Lab Scale Process
Steeping Process

About 30 lbs of dark roast Colombian coffee grounds (French press grind size) may be placed in felt filter bag from McMaster-Carr. A total of 13 such bags may be prepared for this test. As the filter bags are filled with coffee grounds they are simultaneously hand sprayed with RO water using a hose maintained at ambient temperature to render the bag and its contents thoroughly wet. The bags are subsequently sealed and the wet filter bags are then transferred to a single walled stainless steel steeping tank of 300-gallon capacity. The steeping tank is filled with RO water until it reaches about 1,200 lbs. When the final ratio of water to coffee is 3:1 by weight, the tank is closed with a lid and the bags are allowed to soak in the water for 12 hours at 50-60° F. After every 2 to 3 hours the bags are moved around in the steeping tank using a plastic paddle. The coffee filled bags are then manually squeezed gently to capture majority of the liquid present in them. The pH of the extract after the steeping process is about 5.25 and contains approximately 5.15% dissolved solids (Brix). The resulting extract is then pumped directly into a re-sealable liner bag in a tote having a commercially available filter housing of about 20 micron placed between the tank and the tote to capture any potential coffee grounds in the liquid. The tote is refrigerated afterwards for up to 30 days or until further processing.

Alkaline Treatment

Further processing of the extract obtained from the steeping process includes alkaline treatment to increase the pH. This is accomplished by adding at least one buffer including, but not limited to potassium carbonate, potassium hydroxide and tri-potassium phosphate to the extract and measuring the pH using Oakton Instruments pH 700 pH/mV/° C./° F. Bench Meter from Cole-Parmer, located in Vernon Hills, Ill., USA. Addition of one or more of the buffers to the extract, such as potassium carbonate in an amount of about 0.41% from a solution having a strength of 47%, or about 0.35% to about 0.45% of potassium carbonate, raises the pH to 5.95-6.1. To prevent foaming during the mild agitation steps Xiameter AFE-1510 is also added to the extract. The amount of the anti-foam material added to the extract is less than 90 ppm.

UHT Treatment

The buffer treated coffee extract is then subjected to ultra-high temperature treatment. This step includes passing the coffee extract via tubular indirect heat exchangers where a temperature of 300° F. is maintained. The extract is exposed to this high temperature for less than 40 seconds or preferably for less than 10 seconds. Although exposure to heat lowers the pH levels of the extract as expected, the drop in the pH levels is measured to be only between about 0.1 to about 0.3. This is considered a minimal drop in the pH levels because the pH of the coffee extract is still above 5.5 due to the added buffer. The extract also has desirable flavor profiles (i.e., less acidic compared to the pH levels of the steeped extract, smoothness and aroma) after the buffer and thermal treatments.

The final coffee concentrate or product is then filled aseptically in containers such as HDPE bottles. The coffee concentrate remained shelf-stable and smooth with rich coffee flavors for more than 4 months.

Evaluation of pH Changes of Coffee Concentrate Over Time

The coffee concentrate prepared according to the above procedure is then tested for pH changes over a 10-week period at different storage temperatures. For this test the following three samples of the concentrate is used:
 (i) the concentrate is maintained at 4° C. ("refrigerated"),
 (ii) concentrate is maintained at room temperature ("ambient") and
 (iii) concentrate is maintained at 32° C. ("accelerated").

The pH changes of the above three concentrates is measured every week for a period of ten weeks and the results are shown in Table 1 and FIG. 2. As evident from the data the pH levels of the "refrigerated" sample is less acidic compared to the "ambient" and "accelerated" concentrates over a period of about 10 weeks suggesting that the cold brew coffee prepared according to the process described above yields less acidic product that can have extended shelf life when stored at cold temperature.

Example 2

Lab Scale Process

Steeping Process—First Soak

About 13 lbs. of medium roast Colombian coffee grounds was placed in each felt filter bag with a 25-micron mesh size from McMaster-Carr. A total of 180 such bags were prepared for this large scale brewing process.

After the bags were sealed, 90 wet filter bags containing 1170 lbs. of the ground coffee were loaded into each Tank 1, and 2 of 850-gallon capacity, as shown in FIG. 15. A total of 90 coffee bags were distributed into the six compartments of a single tank, Tank 1 or 2, with 15 bags each in a compartment. After loading the tank, the lids of the tank 1 and 2 were closed and RO water was pumped via the conduit 56 and 49 into Tank 1 and 2 respectively, until it reached about 4,100 lbs. in Tank 1 and 1,740 lbs. in Tank 2. In addition to the RO water in Tank 2, 2,350 lbs. of rinse water or rinse extract at 0.76 Brix, obtained from an earlier soak, was added. The pumping of steeping liquid (RO water, or RO water+rinse water) was stopped by shutting the valve in conduit 56. This allowed the steeping liquid within Tank 1 and 2 to re-circulate only via conduit 49 in each tank. The bags were then allowed to soak in the water for 14 hours at 86° F. in Tank 1, and for 11.5 hours at 80° F. in Tank 2. This step is referred to as the "first soak" in FIG. 14. The first soak produced 2350 lbs. of coffee extract at 5.84 Brix. Further addition of 2300 lbs. of rinse water to the tank containing wet coffee bags produced 2301 lbs. of rinse water at 0.76 Brix in Tank 1.

In Tank 2, the first soak produced 2306 lbs. of coffee extract at 6.46 Brix. Further addition of 2300 lbs. of rinse water to the tank with wet bags yielded 2264 lbs. of Coffee extract at 1.01 Brix.

While the soaking process continued in Tanks 1 and 2, bags containing 1170 lbs. of coffee grounds were loaded into Tank 5 and the compartment door 44 and the tank lids 20a,b were closed.

After the completion of the first soak in Tanks 1 and 2, the coffee extract 84 (as shown in FIG. 14) from both tank 1 and 2 was pumped via conduit 58 into Tank 5. This combined extract from tank 1 and 2 served as the steeping liquid for Tank 5 and the steeping process was allowed to continue for 8 hours at 70° F. This step was referred to as the second soak. The second soak in Tank 5 produced 2654 lbs. of coffee extract at 9.85 Brix. Further addition of 2300 lbs. of rinse water into tank 5 yielded 2326 of rinse extract at 2.43 Brix.

After completion of the rinse step in Tanks 1 and 2, the rinse water 80 was pumped into a rinse collection tank 82 (FIG. 15). The coffee bags in both tanks were removed and disposed. After cleaning the tanks 1 and 2 with warm water, both tanks 1 and 2 were ready for another cycle of steeping and rinse steps.

TABLE 1

| | Week | | | | | | | | | |
|---|---|---|---|---|---|---|---|---|---|---|
| | 0 | 1 | 2 | 3 | 4 | 5 | 6 | 7 | 8 | 9 |
| | | | | | pH | | | | | |
| Accelerated | 5.89 | 5.59 | 5.49 | 5.41 | 5.47 | 5.41 | 5.35 | 5.35 | 5.31 | 5.32 |
| Ambient | 5.89 | 5.65 | 5.55 | 5.5 | 5.48 | 5.45 | 5.43 | 5.4 | 5.37 | 5.37 |
| Refrigerated | 5.89 | 5.71 | 5.61 | 5.59 | 5.6 | 5.59 | 5.54 | 5.54 | 5.52 | 5.52 |

While the second soak in Tank 5 was nearing completion, 90 fresh coffee bags were loaded into each Tank 2 and 3 and fresh RO water, or rinse water from tank 1 or 2 was pumped into each tank for a first soak to occur using the same steeping conditions used for Tanks 1 and 2.

The coffee extract 86 after the second soak was subjected to further treatments with processing aids, including addition of one or more buffer to raise the pH from about 5.25 to 6.1. The buffer treated extract 86 was then pumped via a filtration system, having 1 micron and 0.8 micron pleated filters, to capture any potential precipitates including coffee grounds directly into a re-sealable liner bag in a tote 88. The tote was refrigerated afterwards for about a month before packaging.

After removal of extract 86 from Tank 5, the tank was filled with fresh RO water and a single rinse step was carried out. The resulting rinse water was also collected in the rinse collection tank 82. The bags were removed from Tank 5 and disposed (FIGS. 13 and 14). After cleaning Tank 5, it is loaded with coffee bags and is prepared to receive extracts from additional tanks such as Tanks 3 and 4 and the process is repeated. To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When "only A or B but not both" is intended, then the term "only A or B but not both" will be employed. Thus, use of the term "or" herein is the inclusive, and not the exclusive use. As used in the specification and the claims, the singular forms "a," "an," and "the" include the plural. Finally, where the term "about" is used in conjunction with a number, it is intended to include±10% of the number. For example, "about 10" may mean from 9 to 11. Reactant and component refer to the same concept and refer to part of the reactant mixture as a whole. The term film could also refer to a coating or sheet or layer that is applied to a surface. The surface maybe any desired material or shape.

As stated above, while the present application has been illustrated by the description of embodiments, and while the embodiments have been described in considerable detail, it is not the intention to restrict or in any way limit the scope of the appended claims to such detail. Additional advantages and modifications will readily appear to those skilled in the art, having the benefit of this application. Therefore, the application, in its broader aspects, is not limited to the specific details and illustrative examples shown. Departures may be made from such details and examples without departing from the spirit or scope of the general inventive concept.

The invention claimed is:

1. A cold brew process for preparing a liquid coffee beverage concentrate comprising the steps of:
   (i) subjecting at least one first filter bag of infusion material to a first steeping step conducted at ambient or colder temperature to form a coffee beverage extract, and
   (ii) exposing the coffee beverage extract to at least one second filter bag of infusion material in a second steeping step conducted at ambient or colder temperature to form a liquid coffee beverage concentrate having a Brix level of about 10 to about 15.

2. The cold brew process of claim 1, wherein the liquid coffee beverage concentrate is treated with at least one processing aid selected from the group consisting of: addition of buffers to adjust pH, addition of one or more enzymes to mitigate sediment formation, addition of one or more anti-foaming materials, filtration to remove precipitates, and ultra-high temperature treatment.

3. The cold brew process of claim 1, wherein the at least one processing aid is addition of buffers to adjust pH, and the addition is performed using one or more buffers selected from the group consisting of: potassium carbonate, potassium hydroxide, and tri-potassium phosphate.

4. The cold brew process of claim 1, wherein the first steeping step is conducted by exposing the at least one first filter bag of infusion material to a rinse water obtained by exposing to fresh water a filter bag of infusion material that was used in a previous soaking process.

5. The cold brew process of claim 1, wherein the first steeping step is performed for a period of about 10 to about 16 hours at a temperature of about 70° F. to about 85° F.

6. The cold brew process of claim 1, wherein the second steeping step is performed for a period of about 4 to about 8 hours at a temperature of about 60° F. to about 75° F.

7. The cold brew process of claim 1, comprising, after the first steeping step, exposing the at least one first filter bag of infusion material to fresh purified water to form a rinse beverage product.

8. The cold brew process of claim 7, wherein the rinse beverage product has a Brix level ranging from about 1 to about 3.

9. A cold brew process comprising the steps of:
   (i) performing a first soak conducted at ambient or colder temperature in a first vessel to form a first beverage extract, wherein the first vessel contains at least one bag of coffee grounds,
   (ii) performing a second soak conducted at ambient or colder temperature by exposing the first beverage extract to at least one bag of coffee grounds in a second vessel to form a second beverage extract that is a liquid having a Brix level of about 10 to about 15, and
   (iii) subjecting the second beverage extract to treatment with one or more buffers.

10. The process of claim 9, wherein the buffer treated second beverage extract is packaged in a container having a volume of about 100 ml or less, and the container is adapted to be used with a single serve beverage maker.

11. The process of claim 10, wherein the packaged second beverage extract has a pH that does not drop below 5.5 and is shelf-stable for a period of about 6 to about 12 months.

12. The process of claim 9, wherein the buffer treated second beverage extract is aseptically packaged after thermal treatment in a container having a volume of about 100 ml or less, and the container is adapted to be used with a single serve beverage maker.

13. The process of claim 9, wherein the first soak is performed for a period of about 10 to about 16 hours at a temperature in a range of about 70° F. to about 85° F.

14. The process of claim 9, wherein the second soak is performed for a period of about 4 to about 8 hours at a temperature in a range of about 60° F. to about 75° F.

15. The process of claim 9, wherein the first soak is performed in a liquid comprising a rinse beverage extract obtained by exposing to fresh water a filter bag of infusion material that was used in a previous soaking process.

16. A beverage concentrate prepared by the process of claim 9.

17. A cold brew process comprising the steps of:
   (i) performing a first soak conducted at ambient or colder temperature in a first vessel to form a first beverage extract, wherein the first vessel contains at least one bag of coffee grounds, (ii) performing a second soak conducted at ambient or colder temperature by exposing the first beverage extract to at least one bag of coffee grounds to form a second beverage extract having a Brix level of about 10 to about 15, (iii) subjecting the second beverage extract to treatment with one or more buffers, and (iv) aseptically packaging the second beverage extract in a container adapted to be used with a single serve beverage maker.

18. The process of claim 17, wherein the container holds about 100 ml of product or less.

19. The process of claim 17, wherein the aseptically packaged extract has a pH that does not drop below 5.5 and is shelf-stable for a period of about 6 to about 12 months.

20. A coffee concentrate product prepared by the process of claim 17.

21. A cold brew process for preparing a liquid coffee beverage concentrate comprising the steps of:

(i) subjecting at least one first filter bag of infusion material in a first vessel to a first steeping step conducted at ambient or colder temperature to form a coffee beverage extract, (ii) subjecting at least one first filter bag of infusion material in a second vessel to a first steeping step conducted at ambient or colder temperature to form a coffee beverage extract, (iii) combining the coffee beverage extract from the first vessel and the coffee beverage extract from the second vessel to form a combined coffee beverage extract, (iv) providing a third vessel containing the combined coffee beverage extract and at least one filter bag of infusion material, and (v) exposing the at least one filter bag of infusion material in the third vessel to the combined coffee beverage extract in a second steeping step conducted at ambient or colder temperature to form a liquid coffee beverage concentrate having a Brix level of about 10 to about 15.

22. The process of claim 1, wherein the liquid coffee beverage concentrate has a Brix level of about 10 to about 13.

23. The process of claim 4, wherein the liquid coffee beverage concentrate has a Brix level of about 10 to about 13.

24. The process of claim 21, wherein the liquid coffee beverage concentrate has a Brix level of about 10 to about 13.

* * * * *